US009828153B2

(12) United States Patent
York et al.

(10) Patent No.: US 9,828,153 B2
(45) Date of Patent: *Nov. 28, 2017

(54) BEVERAGE CARTRIDGE

(71) Applicant: Koninklijke Douwe Egberts B.V., Utrecht (NL)

(72) Inventors: Geoffrey York, Walsall (GB); Andrew Charles Bentley, Banbury (GB)

(73) Assignee: Koninklijke Douwe Egberts B.V., Utrecht (NL)

( * ) Notice: Subject to any disclaimer, the term of this patent is extended or adjusted under 35 U.S.C. 154(b) by 43 days.

This patent is subject to a terminal disclaimer.

(21) Appl. No.: 14/295,826

(22) Filed: Jun. 4, 2014

(65) Prior Publication Data

US 2014/0287117 A1    Sep. 25, 2014

Related U.S. Application Data

(63) Continuation of application No. 12/267,265, filed on Nov. 7, 2008, now Pat. No. 8,771,768.

(30) Foreign Application Priority Data

Nov. 9, 2007    (GB) .................................. 0722039.5

(51) Int. Cl.
*A23F 5/26* (2006.01)
*B65D 85/804* (2006.01)
(Continued)

(52) U.S. Cl.
CPC ................ *B65D 65/46* (2013.01); *A23F 5/26* (2013.01); *B65D 85/8043* (2013.01)

(58) Field of Classification Search
CPC .................... B65D 85/8043; B65D 85/816; B65D 85/804; B65D 65/46; B65D 2581/3409;
(Continued)

(56) References Cited

U.S. PATENT DOCUMENTS

| 324,049 A | 8/1885 | Thew |
| 1,230,091 A | 6/1917 | Kitchen |

(Continued)

FOREIGN PATENT DOCUMENTS

| CH | WO 2005107541 A1 * | 11/2005 | .......... A47J 31/0668 |
| EP | 0057671 A2 | 8/1982 | |

(Continued)

OTHER PUBLICATIONS

Definition of "swirl" American Heritage Dictionary of the English Language 2011, 2007, 2000.*
(Continued)

*Primary Examiner* — Viren Thakur
(74) *Attorney, Agent, or Firm* — Fitch, Even, Tabin & Flannery LLP

(57) ABSTRACT

A cartridge containing one or more beverage ingredients and comprising an inlet for the introduction of an aqueous medium and an outlet for the beverage produced from the one or more beverage ingredients, the cartridge incorporating within a beverage flow path between the inlet and the outlet an eductor for entraining air into the beverage, the eductor comprising an aperture for producing a low pressure jet of the beverage.

28 Claims, 28 Drawing Sheets

(51) Int. Cl.
B65D 67/00 (2006.01)
B65D 65/46 (2006.01)

(58) Field of Classification Search
CPC ...... B65B 29/02; B65B 29/06; A47J 31/3623; A47J 31/369; A47J 31/3676; A47J 31/368; A47J 31/407
See application file for complete search history.

(56) References Cited

U.S. PATENT DOCUMENTS

| | | |
|---|---|---|
| 1,311,844 A | 7/1919 | Wood |
| 1,576,735 A | 3/1926 | Fessenden |
| 1,887,905 A | 11/1932 | Schweigart |
| 2,589,801 A | 3/1952 | Grindrod |
| 2,778,739 A | 1/1957 | Rodth |
| 3,083,101 A | 3/1963 | Noury |
| 3,292,527 A | 12/1966 | Stasse |
| 3,336,857 A | 8/1967 | Knodt et al. |
| 3,607,297 A | 9/1971 | Fasano |
| 3,790,029 A | 2/1974 | Ward |
| 3,806,607 A | 4/1974 | Whelan |
| 3,821,420 A | 6/1974 | Arden |
| 3,823,656 A | 7/1974 | Vander Veken |
| 3,833,740 A | 9/1974 | Schmidt |
| 4,253,385 A | 3/1981 | Illy |
| 4,334,640 A | 6/1982 | vanOverbruggen |
| 4,382,402 A | 5/1983 | Alvarez |
| 4,471,689 A | 9/1984 | Piana |
| 4,738,378 A | 4/1988 | Oakley |
| 4,775,048 A | 10/1988 | Baecchi |
| 4,806,375 A | 2/1989 | Favre |
| 4,818,544 A | 4/1989 | Seward |
| 4,853,234 A | 8/1989 | Bentley |
| 4,867,993 A | 9/1989 | Nordskog |
| 4,873,915 A | 10/1989 | Newman |
| 4,875,408 A | 10/1989 | McGee |
| 4,886,674 A | 12/1989 | Seward |
| 4,920,870 A | 5/1990 | Newman |
| 4,921,712 A | 5/1990 | Malmquist |
| 4,925,683 A | 5/1990 | Fischbach |
| 4,990,352 A | 2/1991 | Newman |
| 5,005,759 A | 4/1991 | Bouche |
| 5,082,676 A | 1/1992 | Love |
| 5,197,374 A | 3/1993 | Fond |
| 5,242,702 A | 9/1993 | Fond |
| 5,272,960 A | 12/1993 | Kinna |
| 5,325,765 A | 7/1994 | Sylvan |
| 5,343,799 A | 9/1994 | Fond |
| 5,347,916 A | 9/1994 | Fond |
| 5,398,595 A | 3/1995 | Fond |
| 5,398,596 A | 3/1995 | Fond |
| 5,472,719 A | 12/1995 | Favre |
| 5,531,152 A | 7/1996 | Gardosi |
| 5,531,604 A | 7/1996 | Huang |
| 5,603,254 A | 2/1997 | Fond |
| 5,637,335 A | 6/1997 | Fond |
| 5,638,740 A | 6/1997 | Cai |
| 5,638,741 A | 6/1997 | Cisaria |
| 5,649,412 A | 7/1997 | Binacchi |
| 5,649,472 A | 7/1997 | Fond |
| 5,762,987 A | 6/1998 | Fond |
| 5,773,056 A | 6/1998 | Hohenthal |
| 5,776,527 A | 7/1998 | Blanc |
| 5,794,519 A | 8/1998 | Fischer |
| 5,826,492 A | 10/1998 | Fond |
| 5,840,189 A | 11/1998 | Sylvan |
| 5,895,672 A | 4/1999 | Cooper |
| 5,897,899 A | 4/1999 | Fond |
| 5,948,455 A | 9/1999 | Schaeffer |
| 5,974,950 A | 11/1999 | King |
| 6,021,705 A | 2/2000 | Dijs |
| 6,025,000 A | 2/2000 | Fond |
| 6,062,127 A | 5/2000 | Klosinski |
| 6,068,871 A | 5/2000 | Fond |
| 6,117,471 A | 9/2000 | King |
| 6,139,896 A | 10/2000 | Daenzer-Alloncle |
| 6,142,063 A | 11/2000 | Beaulieu |
| 6,182,554 B1 | 2/2001 | Beaulieu |
| 6,186,051 B1 | 2/2001 | Aarts |
| 6,240,832 B1 | 6/2001 | Schmed |
| 6,245,371 B1 | 6/2001 | Gutwein |
| 6,289,948 B1 | 9/2001 | Jeannin |
| 6,347,725 B1 | 2/2002 | Yoakim |
| 6,350,484 B1 | 2/2002 | Ault |
| 6,358,545 B1 | 3/2002 | Chandler |
| 6,468,576 B1 | 10/2002 | Sher |
| 6,606,938 B2 | 8/2003 | Taylor |
| 6,607,762 B2 | 8/2003 | Lazaris |
| 6,644,173 B2 | 11/2003 | Lazaris |
| 6,645,537 B2 | 11/2003 | Sweeney |
| 6,658,989 B2 | 12/2003 | Sweeney |
| 6,698,333 B2 | 3/2004 | Halliday |
| 6,740,345 B2 | 5/2004 | Cai |
| 6,758,130 B2 | 7/2004 | Sargent |
| 6,832,542 B2 | 12/2004 | Hu |
| 6,840,158 B2 | 1/2005 | Cai |
| 6,849,285 B2 | 2/2005 | Masek |
| 6,941,855 B2 | 9/2005 | Denisart |
| 7,097,074 B2 | 8/2006 | Halliday |
| 7,213,506 B2 | 5/2007 | Halliday |
| 7,219,598 B2 | 5/2007 | Halliday |
| 7,231,869 B2 | 6/2007 | Halliday |
| 7,243,598 B2 | 7/2007 | Halliday |
| 7,255,039 B2 | 8/2007 | Halliday |
| 7,287,461 B2 | 10/2007 | Halliday |
| 7,308,851 B2 | 12/2007 | Halliday |
| 7,316,178 B2 | 1/2008 | Halliday |
| 7,322,277 B2 | 1/2008 | Halliday |
| 7,325,479 B2 | 2/2008 | Laigneau |
| 7,328,651 B2 | 2/2008 | Halliday |
| 7,335,387 B2 | 2/2008 | Hayes |
| 7,340,990 B2 | 3/2008 | Halliday |
| 7,418,899 B2 | 9/2008 | Halliday |
| 7,444,925 B2 | 11/2008 | Mahlich |
| 7,533,603 B2 | 5/2009 | Halliday |
| 7,533,604 B2 | 5/2009 | Halliday |
| 7,592,027 B2 | 9/2009 | Halliday |
| 7,607,385 B2 | 10/2009 | Halliday |
| 8,771,768 B2 | 7/2014 | York |
| 2001/0019735 A1 | 9/2001 | Cirkel-Egner |
| 2001/0048957 A1 | 12/2001 | Lazaris |
| 2002/0002913 A1 | 1/2002 | Mariller |
| 2002/0015768 A1 | 2/2002 | Masek |
| 2002/0023543 A1 | 2/2002 | Schmed |
| 2002/0048621 A1 | 4/2002 | Boyd |
| 2002/0078831 A1 | 6/2002 | Cai |
| 2002/0088807 A1 | 7/2002 | Perkovic |
| 2002/0129712 A1 | 9/2002 | Westbrook |
| 2002/0144603 A1 | 10/2002 | Taylor |
| 2002/0144604 A1 | 10/2002 | Winkler |
| 2002/0148356 A1 | 10/2002 | Lazaris |
| 2003/0005826 A1 | 1/2003 | Sargent |
| 2003/0033938 A1* | 2/2003 | Halliday ............ B65D 85/8043 99/275 |
| 2003/0039731 A1 | 2/2003 | Dalton |
| 2003/0056661 A1* | 3/2003 | Hu ...................... A47J 31/0668 99/495 |
| 2003/0066431 A1 | 4/2003 | Fanzutti |
| 2003/0145736 A1 | 8/2003 | Green |
| 2003/0222089 A1 | 12/2003 | Hale |
| 2004/0009281 A1* | 1/2004 | Green .................... A47J 43/12 426/590 |
| 2004/0182250 A1 | 9/2004 | Halliday |
| 2004/0182251 A1* | 9/2004 | Halliday ............ A47J 31/4407 99/279 |
| 2004/0188459 A1* | 9/2004 | Halliday ............ A47J 31/0673 222/83 |
| 2004/0191371 A1 | 9/2004 | Halliday |
| 2004/0228955 A1 | 11/2004 | Denisart |
| 2004/0237793 A1 | 12/2004 | Zurcher |
| 2007/0144355 A1 | 6/2007 | Denisart |
| 2007/0175334 A1 | 8/2007 | Halliday |

(56) References Cited

U.S. PATENT DOCUMENTS

| | | | | |
|---|---|---|---|---|
| 2007/0248734 | A1 | 10/2007 | Denisart | |
| 2008/0160153 | A1* | 7/2008 | Hestekin | A23L 1/296 |
| | | | | 426/590 |
| 2012/0118166 | A1* | 5/2012 | Macchi | B65D 85/8043 |
| | | | | 99/295 |

FOREIGN PATENT DOCUMENTS

| | | | |
|---|---|---|---|
| EP | 0272922 A2 | 6/1988 | |
| EP | 0324072 A1 | 7/1989 | |
| EP | 0334571 A1 | 9/1989 | |
| EP | 0334572 A1 | 9/1989 | |
| EP | 0162417 B1 | 3/1990 | |
| EP | 0449533 A1 | 10/1991 | |
| EP | 0451980 A1 | 10/1991 | |
| EP | 0455337 A1 | 11/1991 | |
| EP | 0521510 A1 | 1/1993 | |
| EP | 0524464 A1 | 1/1993 | |
| EP | 0638486 A1 | 2/1995 | |
| EP | 0604615 B1 | 9/1998 | |
| EP | 0870457 A1 | 10/1998 | |
| EP | 0904718 A1 | 3/1999 | |
| EP | 0756844 B1 | 5/1999 | |
| EP | 1042978 A1 | 10/2000 | |
| EP | 1090574 A1 | 4/2001 | |
| EP | 1101430 A1 | 5/2001 | |
| EP | 0878158 B1 | 3/2002 | |
| EP | 1440903 A1 | 7/2004 | |
| EP | 1541070 B1 | 11/2006 | |
| EP | 1744653 | 1/2007 | |
| FR | 1537031 A | 8/1968 | |
| FR | 2322796 A | 4/1977 | |
| GB | 1215840 A | 12/1970 | |
| GB | 2306432 A | 5/1997 | |
| GB | 2374795 A | 10/2002 | |
| GB | 2374816 A | 10/2002 | |
| GB | 2374856 A | 10/2002 | |
| GB | 2379624 A | 3/2003 | |
| GB | WO 2005080222 A1 * | 9/2005 | B65D 85/8043 |
| JP | 63092317 A | 4/1988 | |
| JP | 04236921 A | 8/1992 | |
| JP | 2000093309 A | 4/2000 | |
| JP | 2001061663 A | 3/2001 | |
| NL | 1020835 C2 | 12/2003 | |
| NL | WO 2007120047 A2 * | 10/2007 | A47J 31/407 |
| WO | 8807472 A1 | 10/1988 | |
| WO | 9507648 A1 | 3/1995 | |
| WO | 9717006 A1 | 5/1997 | |
| WO | 0115582 A1 | 3/2001 | |
| WO | 0160219 A1 | 8/2001 | |
| WO | 0160220 A1 | 8/2001 | |
| WO | 0219875 A1 | 3/2002 | |
| WO | 0228241 A1 | 4/2002 | |
| WO | 0244956 A1 | 6/2002 | |
| WO | 02074143 A2 | 9/2002 | |
| WO | 02074661 A1 | 9/2002 | |
| WO | 02085170 A2 | 10/2002 | |
| WO | 02092439 A2 | 11/2002 | |
| WO | 02085170 A3 | 3/2003 | |
| WO | 03026470 A2 | 4/2003 | |
| WO | 03053200 A1 | 7/2003 | |
| WO | 03065859 A2 | 8/2003 | |
| WO | 03073896 A1 | 9/2003 | |
| WO | 03065859 A3 | 12/2003 | |
| WO | 03059778 A3 | 1/2004 | |
| WO | WO 2005107541 A1 * | 11/2005 | A47J 31/0668 |
| WO | 2006111890 | 10/2006 | |

OTHER PUBLICATIONS

Definition of "vortex" Dictionary.com Feb. 6, 2007.*
Machine Translation of WO2005107541 retrieved Jun. 28, 2016.*
European Patent Office Search Report for European Application EP 04 25 0357.3 dated May 11, 2004, 3 pages.
European Patent Office Search Report for European Application EP 04 25 0360.7 dated May 7, 2004, 3 pages.
European Patent Office Search Report for European Application EP 04 25 0361.5 dated May 4, 2004, 3 pages.
European Patent Office Search Report for European Application EP 04 25 0362.3 dated Mar. 22, 2004, 3 pages.
European Patent Office Search Report for European Application EP 04 25 0363.1 dated May 17, 2004, 3 pages.
European Patent Office Partial Search Report for European Application EP 04 25 0364.9 dated May 11, 2004, 4 pages.
European Patent Office Search Report for European Application EP 04 25 0365.6 dated May 7, 2004, 4 pages.
European Patent Office Search Report for European Application EP 04 25 0366.4 dated Mar. 18, 2004, 3 pages.
European Patent Office Search Report for European Application EP 04 25 0376.3 dated Mar. 23, 2004, 3 pages.
European Patent Office Search Report for European Application EP 04 25 0377.1 dated May 7, 2004, 3 pages.
European Patent Office Search Report for European Application EP 04 25 0380.5 dated May 10, 2004, 3 pages.
European Patent Office Search Report for European Application EP 04 25 0381.3 dated May 7, 2004, 4 pages.
European Patent Office Search Report for European Application EP 04 25 0382.1 dated May 7, 2004, 3 pages.
European Patent Office Search Report for European Application EP 04 25 0383.9 dated May 28, 2004, 4 pages.
European Patent Office Search Report for European Application EP 04 25 0384.7 dated May 7, 2004, 3 pages.
European Patent Office Search Report for European Application EP 04 25 0388.8 dated Jun. 1, 2004, 3 pages.
European Patent Office Search Report for European Application EP 04 25 0389.6 dated May 17, 2004, 3 pages.
European Patent Office Search Report for European Application EP 04 25 0390.4 dated Jun. 17, 2004, 4 pages.
PCT Invitation to Pay Additional Fees and Communication Relating to the Results of the Partial International Search Report of the European Patent Office International Searching Authority for International Application PCT/GB2004/000265 dated Jun. 17, 2004, 6 pages.
PCT International Search Report and Written Opinion of the European Patent Office International Searching Authority for International Application PCT/GB2004/000268 dated May 24, 2004, 10 pages.
PCT Invitation to Pay Additional Fees and Communication Relating to the Results of the Partial International Search Report of the European Patent Office International Searching Authority for International Application PCT/GB2004/000272 dated May 11, 2004, 5 pages.
PCT International Search Report and Written Opinion of the European Patent Office International Searching Authority for International Application PCT/GB2004/000272 dated Sep. 7, 2004, 17 pages.
PCT International Search Report and Written Opinion of the European Patent Office International Searching Authority for International Application PCT/GB2004/000273 dated May 12, 2004, 9 pages.
PCT Invitation to Pay Additional Fees and Communication Relating to the Results of the Partial International Search Report of the European Patent Office International Searching Authority for International Application PCT/GB2004/000276 dated May 24, 2004, 7 pages.
PCT International Search Report and Written Opinion of the European Patent Office International Searching Authority for International Application PCT/GB2004/000276 dated Sep. 7, 2004, 19 pages.
PCT International Search Report and Written Opinion of the European Patent Office International Searching Authority for International Application PCT/GB2004/000279 dated May 17, 2004, 9 pages.
PCT International Search Report and Written Opinion of the European Patent Office International Searching Authority for International Application PCT/GB2004/000282 dated Jun. 3, 2004, 9 pages.

(56) References Cited

OTHER PUBLICATIONS

PCT International Search Report and Written Opinion of the European Patent Office International Searching Authority for International Application PCT/GB2004/000287 dated Jun. 16, 2004, 10 pages.
The United Kingdom Patent Office Combined Search and Examination Report for Great Britain Application GB 0301679.7 dated Jun. 16, 2003, 4 pages.
The United Kingdom Patent Office Combined Search and Examination Report for Great Britain Application GB 0301680.5 dated Jun. 19, 2003, 5 pages.
The United Kingdom Patent Office Combined Search and Examination Report for Great Britain Application GB 0301681.3 dated Jun. 24, 2003, 4 pages.
The United Kingdom Patent Office Combined Search and Examination Report for Great Britain Application GB 0301696.1 dated May 27, 2003, 4 pages.
The United Kingdom Patent Office Combined Search and Examination Report for Great Britain Application GB 0301698.7 dated Jun. 16, 2003, 4 pages.
The United Kingdom Patent Office Combined Search and Examination Report for Great Britain Application GB 0301702.7 dated May 16, 2003, 4 pages.
The United Kingdom Patent Office Combined Search and Examination Report for Great Britain Application GB 0301708.4 dated Jun. 12, 2003, 4 pages.
The United Kingdom Patent Office Combined Search and Examination Report for Great Britain Application GB 0301709.2 dated May 8, 2003, 4 pages.
The United Kingdom Patent Office Combined Search and Examination Report for Great Britain Application GB 0301710.0 dated Jun. 12, 2003, 4 pages.
The United Kingdom Patent Office Combined Search and Examination Report for Great Britain Application GB 0301713.4 dated Jul. 16, 2003, 5 pages.
The United Kingdom Patent Office Combined Search and Examination Report for Great Britain Application GB 0301733.2 dated Jun. 27, 2003, 4 pages.
The United Kingdom Patent Office Combined Search and Examination Report for Great Britain Application GB 0301734.0 dated Jun. 27, 2003, 4 pages.
The United Kingdom Patent Office Combined Search and Examination Report for Great Britain Application GB 0301735.7 dated Jul. 4, 2003, 4 pages.
The United Kingdom Patent Office Combined Search and Examination Report for Great Britain Application GB 0301738.1 dated Jun. 9, 2003, 4 pages.
The United Kingdom Patent Office Combined Search and Examination Report for Great Britain Application GB 0301739.9 dated Jun. 17, 2003, 6 pages.
The United Kingdom Patent Office Combined Search and Examination Report for Great Britain Application GB 0301741.5 dated Jun. 16, 2003, 4 pages.
The United Kingdom Patent Office Combined Search and Examination Report for Great Britain Application GB 0301745.6 dated Jun. 17, 2003, 4 pages.
The United Kingdom Patent Office Combined Search and Examination Report for Great Britain Application GB 0301747.2 dated May 30, 2003, 5 pages.
European Patent Office Communication of a Notice of Opposition dated Mar. 22, 2007, Opposition to European Patent EP 1 440 910 B1 by Opponent Mars Incorporated, 17 pages.
Harold McGee, "On Food and Cooking," The Science and Lore of the Kitchen, Harper Collins Publishers, London, 1991, p. 16.
Codex Standard for Evaporated Milks, Codex Stan A-3-1971, Rev. Jan. 1999, 3 pages.
European Patent Office Communication of a Notice of Opposition dated Mar. 22, 2007, Opposition to European Patent EP 1 440 910 B1 by Opponent Nestec S.A., 12 pages.
Food Composition and Nutrition Tables, Dairy Products, Medpharm Scientific Publishers, Stuttgart, 1994, 5 pages.
Notice of Opposition to a European Patent dated May 16, 2007, Opposition to European Patent EP 1 440 908 B1 by Opponent Friesland Brands B.V., 22 pages.
Notice of Opposition to a European Patent dated May 16, 2007, Opposition to European Patent EP 1 440 908 B1 by Opponent Nestec S.A., 9 pages.
European Patent Office Communication of a Notice of Opposition dated May 22, 2007, Opposition to European Patent EP 1 440 908 B1 by Opponent Sara Lee/DE N.V., 13 pages.
"More Solutions to Sticky Problems," A Guide to Getting More From Your Brookfield Viscometer, Brookfield Engineering Laboratories, Inc., Stoughton, Massachusetts, date unknown, 28 pages.
"The Helipath Stand," A Brookfield Viscometer Accessory, Brookfield Engineering Laboratories, Inc., Stoughton, Massachusetts, date unknown, 2 pages.
European Patent Office Brief Communication dated Jul. 9, 2007, Opposition to European Patent EP 1 440 908 B1, Letter from Opponent Friesland Brands B.V. dated Jul. 3, 2007, 21 pages.
European Patent Office Communication of a Notice of Opposition dated Aug. 12, 2008, Opposition to European Patent EP 1 440 640 B1 by Opponent Nestec S.A., 17 pages.
European Patent Office Brief Communication dated Aug. 30, 2007, Opposition to European Patent EP 1 440 910 B1, Letter from Opponent Mars Incorporated dated Aug. 22, 2007, 3 pages.
Notice of Opposition to a European Patent dated Sep. 13, 2007, Opposition to European Patent EP 1 440 909 B1 by Opponent Friesland Brands B.V., 9 pages.
Notice of Opposition to a European Patent dated Sep. 13, 2007, Opposition to European Patent EP 1 440 909 B1 by Opponent Nestec S.A., 7 pages.
European Patent Office Extended European Search Report for European Application EP 08 25 3673.1 dated Jul. 27, 2009, 6 pages.
Canadian Patent office, Official Action dated Feb. 5, 2015 from related Canadian Patent App. No. 2,643,479 (2 pages).

\* cited by examiner

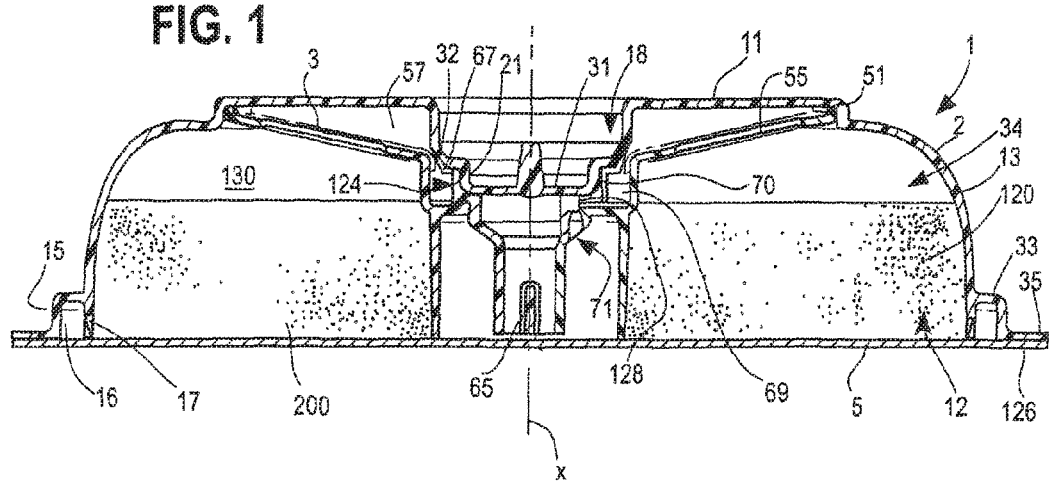
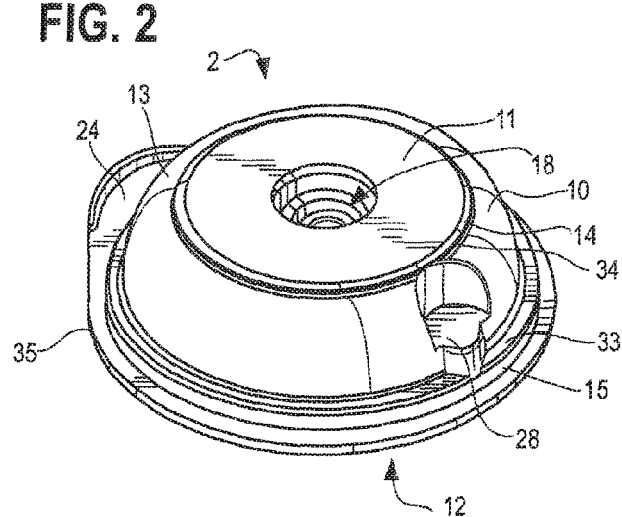
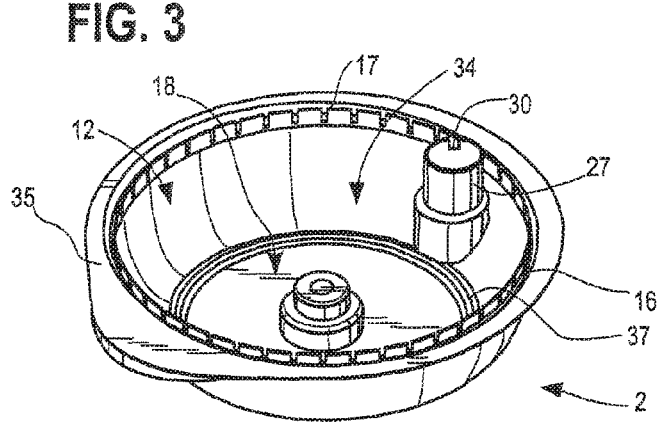

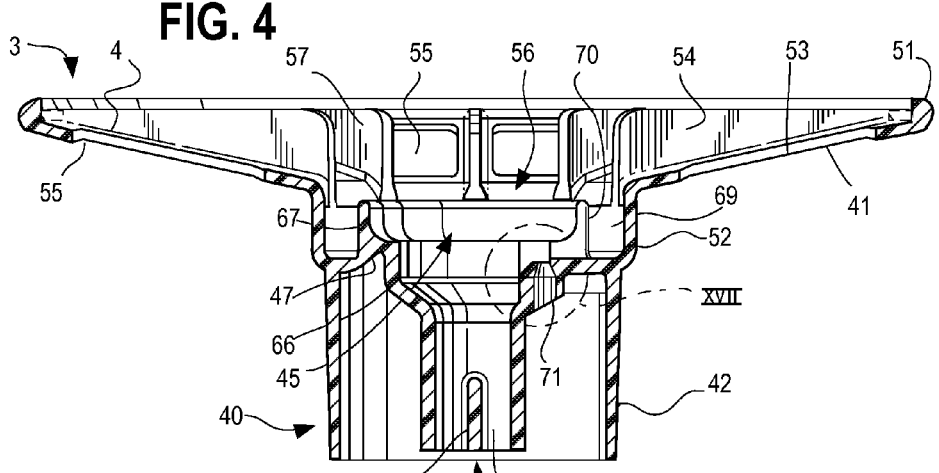
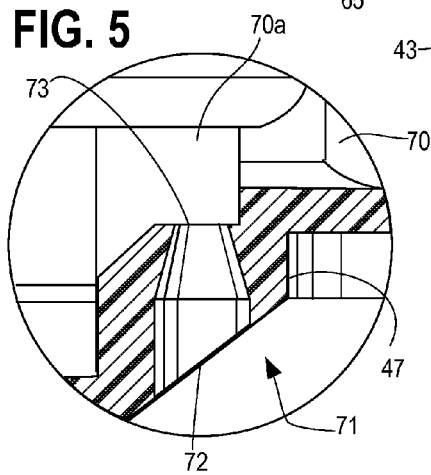
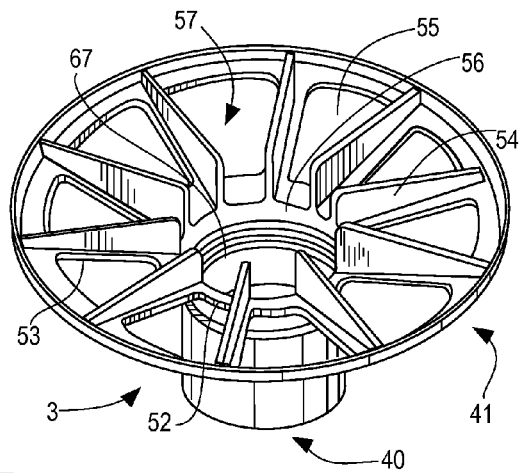
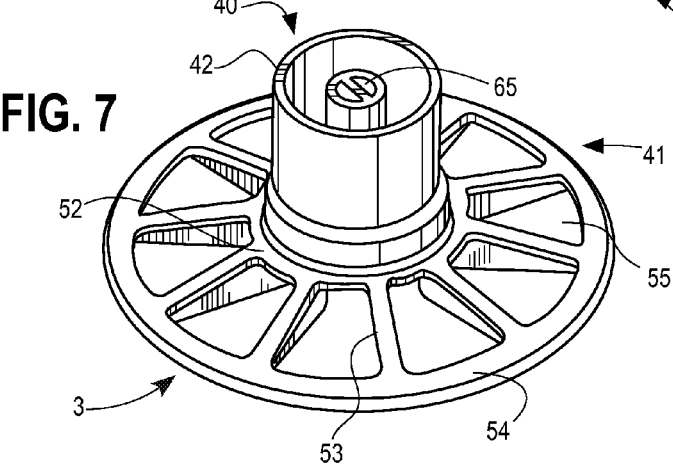

Foam Rating 5

Foam Rating 4.5

Foam Rating 4

Foam Rating 3.5

Foam Rating 3

Foam Rating 2.5

Foam Rating 2

Foam Rating 1.5

Foam Rating 1

Foam Rating 0.5

Foam Rating 0

Full

Thin

Hole 1

Hole 2

No Coverage

BEVERAGE CARTRIDGE

CROSS-REFERENCE TO RELATED APPLICATIONS

This application is a continuation of U.S. patent application Ser. No. 12/267,265, filed Nov. 7, 2008, which claims priority from United Kingdom Application GB 0722039.5, filed Nov. 9, 2007, which are both hereby incorporated herein by reference in their entireties.

FIELD

The present invention relates to improvements in cartridges for producing beverages and, in particular, for producing beverages that comprise a fine bubble foam on the surface of the beverage, known as crema.

BACKGROUND

EP1255685 describes a cartridge for use in a beverage preparation machine for dispensing an espresso-style coffee beverage. The cartridge comprises one or more restrictions for forming a jet or jets of beverage. At least one air inlet is provided and the jet (or jets) of beverage is passed over said at least one air inlet to thereby draw up air through the air inlet and entrain air bubbles in the flow of beverage. The flow of beverage then passes along an expansion chamber to an outlet where it is dispensed. In one embodiment, the cartridge further comprises within the beverage flowpath a surface upon which the beverage impinges.

EP1440903 also describes a cartridge for use in a beverage preparation machine for dispensing an espresso-style coffee beverage. The cartridge comprises an eductor having an air inlet, and means for forming a low pressure jet of beverage which is passed over said air inlet to thereby draw up air through the air inlet and entrain the air bubbles in the flow of beverage.

Whilst the cartridges described in EP1255685 and EP1440903 have been found to be effective, it would be desirable to produce an improved cartridge wherein the quality of the crema delivered into the cup is improved and/or controlled.

SUMMARY

Consequently, there is provided, in a first aspect, a cartridge containing one or more beverage ingredients and comprising an inlet for the introduction of an aqueous medium and an outlet for the beverage produced from the one or more beverage ingredients, the cartridge incorporating within a beverage flow path between the inlet and the outlet an eductor for entraining air into the beverage, the eductor comprising an aperture for producing a low pressure jet of the beverage, at least one air inlet, a deflector channel downstream of the aperture for imparting an asymmetrical flow to the beverage, and at least one impact surface onto which the jet of beverage impinges.

In a second aspect, there is provided a cartridge containing one or more beverage ingredients and comprising an inlet for the introduction of an aqueous medium and an outlet for the beverage produced from the one or more beverage ingredients, the cartridge incorporating within a beverage flow path between the inlet and the outlet an eductor for entraining air into the beverage, the eductor comprising an aperture for producing a reduced pressure jet of the beverage, at least one air inlet, and a deflecting channel downstream of the aperture, the cartridge further comprising a circulation chamber between the deflecting channel of the eductor and the outlet, the deflecting channel entering the circulation chamber from a periphery of said circulation chamber and the outlet of the cartridge being located at or near a centre of said circulation chamber, wherein the circulation chamber is shaped to cause the beverage exiting the deflecting channel of the eductor to whirl around the circulation chamber before exiting the outlet.

In a further aspect, there is provided a cartridge containing one or more beverage ingredients and comprising an inlet for the introduction of an aqueous medium and an outlet for the beverage produced from the one or more beverage ingredients, the cartridge incorporating within a beverage flow path between the inlet and the outlet an eductor for entraining air into the beverage, the eductor comprising an aperture for producing a reduced pressure jet of the beverage, and at least one air inlet, the cartridge further comprising a circulation chamber between the eductor and the outlet, the outlet being provided with a discharge spout comprising at least one fin for controlling an outflow direction of the beverage issuing from the cartridge.

In a further aspect, there is provided a cartridge containing one or more beverage ingredients and comprising an inlet for the introduction of an aqueous medium and an outlet for the beverage produced from the one or more beverage ingredients, the cartridge incorporating within a beverage flow path between the inlet and the outlet an eductor for entraining air into the beverage, the eductor comprising an aperture for producing a reduced pressure jet of the beverage, at least one air inlet lying in a first plane, and a deflector channel downstream of the at least one air inlet for imparting an asymmetrical flow to the beverage, the deflector channel comprising at least one impact surface lying in a second plane, wherein the first and second planes are not parallel to one another.

In a further aspect, there is provided a method of varying the quality and/or quantity of crema produced by a cartridge comprising the step of varying any one or more of the following parameters of the deflector channel:

the angle of or radius of curvature of a wall of the deflector channel;

the angle between the path of the jet of beverage and the at least one impact surface upon which it impinges;

the distance between the aperture and the point of impact of the central region of the jet of beverage upon the at least one impact surface;

the fluid velocity of the jet of beverage exiting the aperture;

the potential power dissipation of the jet of beverage on impact with the impact surface;

the average air inclusion flow rate into the eductor; and/or the pressure profile in the deflector channel.

BRIEF DESCRIPTION OF THE DRAWINGS

Preferred embodiments of the present invention will now be described, by way of example only, with reference to the accompanying drawings in which:

FIG. 1 is a cross-section view through a prior art beverage cartridge;

FIG. 2 is a perspective view from above of an outer member of the cartridge of FIG. 1;

FIG. 3 is a perspective view from above of the outer member of FIG. 2 in an inverted orientation;

FIG. 4 is a cross-sectional view of an inner member of the cartridge of FIG. 1;

FIG. 5 is an enlarged cross-sectional view of a portion XVII of the inner member of FIG. 4;

FIG. 6 is a perspective view from above of the inner member of FIG. 4;

FIG. 7 is a perspective view from above of the inner member of FIG. 4 in an inverted orientation;

FIG. 13b is an illustration of the crema formed on a beverage produced using the cartridge of FIG. 13a;

FIG. 14b is an illustration of the crema formed on a beverage produced using the cartridge of FIG. 14a;

FIG. 15b is an illustration of the crema formed on a beverage produced using the cartridge of FIG. 15a;

FIG. 16b is an illustration of the crema formed on a beverage produced using the cartridge of FIG. 16a;

FIG. 17b is an illustration of the crema formed on a beverage produced using the cartridge of FIG. 17a;

DETAILED DESCRIPTION

Figure 8:
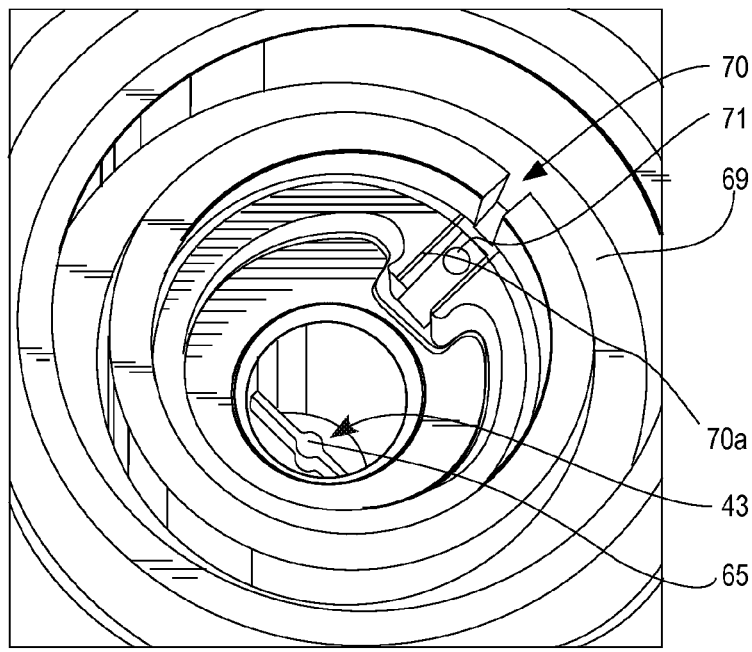
FIG. 8 is a perspective view of a portion of an interior of a prior art cartridge similar to FIG. 1.

FIGS. 1 to 8 illustrate a prior art cartridge 1 which is described in detail in the applicant's European patent publication EP1440903. The cartridge 1 is particularly designed for use in dispensing espresso-style products such as roast and ground coffee where it is desirable to produce a beverage having a froth of tiny bubbles known as a crema.

As shown in FIG. 1, the cartridge 1 generally comprises an outer member 2 (shown in more detail in FIGS. 2 and 3), an inner member 3 (shown in more detail in FIGS. 4 to 7) and a laminate 5. The outer member 2, inner member 3 and laminate 5 are assembled to form the cartridge 1 which has an interior 120 for containing one or more beverage ingredients 200. An inlet 27 and an outlet 43 are initially sealed by the laminate 5 and are opened in use by piercing or cutting portions of the laminate 5. A beverage flow path between the inlet 27 and outlet 43 is defined by spatial inter-relationships between the outer member 2, inner member 3 and laminate 5.

The overall shape of the cartridge 1 is generally circular or disc-shaped.

As best shown in FIGS. 2 and 3, the outer member 2 generally comprises a bowl-shaped shell 10 having a curved annular wall 13, a closed top 11 and an open bottom 12. The annular wall 13 and closed top 11 together define a receptacle having an interior 34.

A hollow inwardly directed cylindrical extension 18 is provided in the closed top 11 centred on the major axis X. An outwardly extending shoulder 33 is formed in the outer member 2 towards the bottom 12. The outwardly extending shoulder 33 forms a secondary wall 15 co-axial with the annular wall 13 so as to define an annular track forming a manifold 16 between the secondary wall 15 and the annular wall 13. The manifold 16 passes around the circumference of the outer member 2. A series of slots 17 are provided in the annular wall 13 level with the manifold 16 to provide gas and liquid communication between the manifold 16 and the interior 34 of the outer member 2.

A lower end of the outwardly extending shoulder 33 is provided with an outwardly extending flange 35.

As best shown in FIGS. 4 to 7, the inner member 3 comprises an annular frame 41 and a downwardly extending cylindrical funnel 40. The annular frame 41 comprises an outer rim 51 and an inner hub 52 joined by radial spokes 53. The inner hub 52 is integral with and extends from the cylindrical funnel 40. Filtration apertures 55 are formed in the annular frame 41 between the radial spokes 53. A filter 4 is disposed on the annular frame 41 so as to cover the filtration apertures 55. Passages 57 are formed above the frame 41 between webs 54.

The cylindrical funnel 40 comprises an outer tube 42 surrounding an inner discharge spout 43. The outer tube 42 forms the exterior of the cylindrical funnel 40. The discharge spout 43 is joined to the outer tube 42 at an upper end of the discharge spout 43 by means of an annular flange 47. The discharge spout 43 comprises an inlet 45 at an upper end which communicates with openings 56 of the passages 57 and an outlet 44 at a lower end through which the prepared beverage is discharged into a cup or other receptacle. The discharge spout 43 is provided with a partition 65 which extends part way up the discharge spout from the outlet 44.

The inner member 3 spans between the outer member 2 and the laminate 5.

A rim 67 is provided upstanding from the annular flange 47 joining the outer tube 42 to the discharge spout 43. The rim 67 surrounds the inlet 45 to the discharge spout 43 and defines an annular channel 69 between the rim 67 and the upper portion of the outer tube 42. The rim 67 is provided with an inwardly directed shoulder. At one point around the circumference of the rim 67 an aperture 70 is provided in the form of a slot which extends from an upper edge of rim 67 to a point marginally below the level of the shoulder.

With particular reference to FIGS. 4 and 5, an air inlet 71 is provided in annular flange 47 circumferentially aligned with the aperture 70. The air inlet 71 comprises an aperture passing through the flange 47 so as to provide communication between a point above the flange 47 and the void space below the flange 47 between the outer tube 42 and discharge spout 43. The air inlet 71 comprises an upper frusto-conical portion 73 and a lower cylindrical portion 72.

On assembly, as shown in FIG. 1, the cylindrical extension 18 is seated inside the support rim 67. A shoulder of the cylindrical extension 18 bears against the upper edge of the support rim 67 of the inner member 3. An interface 124 is thus formed between the inner member 3 and the outer member 2 comprising a face seal between the cylindrical extension 18 and the support rim 67 which extends around nearly the whole circumference of the cartridge 1. The seal between the cylindrical extension 18 and the support rim 67 is not fluid-tight though since the slot 70 in the support rim 67 extends through the support rim 67 and downwardly to a point marginally below the shoulder. Consequently the interface fit between the cylindrical extension 18 and the support rim 67 transforms the slot 70 into a rectangular shaped aperture 128 providing gas and liquid communication between the annular channel 69 and the discharge spout 43.

To use the cartridge 1 it is first inserted into a beverage preparation machine and the inlet 27 and outlet 43 are opened by piercing members of the beverage preparation machine which perforate and fold back the laminate 5. An aqueous medium, typically water, under pressure enters the cartridge 1 through the inlet 27. The water is directed to flow round the manifold 16 and into the interior 120 of the cartridge 1 through the plurality of slots 17. The water mixes with the beverage ingredients 200 contained therein. The water is at the same time forced upwardly through the beverage ingredients. The beverage formed by passage of the water through the beverage ingredients passes through the filter 4 and filtration apertures 55 into the passages 57 lying above the annular frame 41.

The beverage then flows downwardly along the radial passages 57 and through the openings 56 and into the annular channel 69. From the annular channel 69 the beverage is forced under pressure through the aperture 128 by the back pressure of beverage collecting in the interior 120 and passages 57. The beverage is thus forced through aperture 128 as a jet and into an expansion chamber formed by the upper end of the discharge spout 43. The jet of beverage passes directly over the air inlet 71. As the beverage passes through the aperture the pressure of the beverage drops. As a result air is entrained into the beverage stream in the form of a multitude of small air bubbles as the air is drawn up through the air inlet 71. The beverage issuing from the aperture 128 is funneled downwards to the outlet 44 where the beverage is discharged into a receptacle such as a cup where the air bubbles form the desired crema. Thus, the aperture 128 and the air inlet 71 together form an eductor which acts to entrain air into the beverage.

As shown in FIGS. 1, 5 and 8, the walls 70*a* of the slot 70 are straight-sided and are oriented such that the aperture 128 directs the jet of beverage into the upper portion of the discharge spout 43 directly towards the centre of the discharge spout 43.

Figure 9:
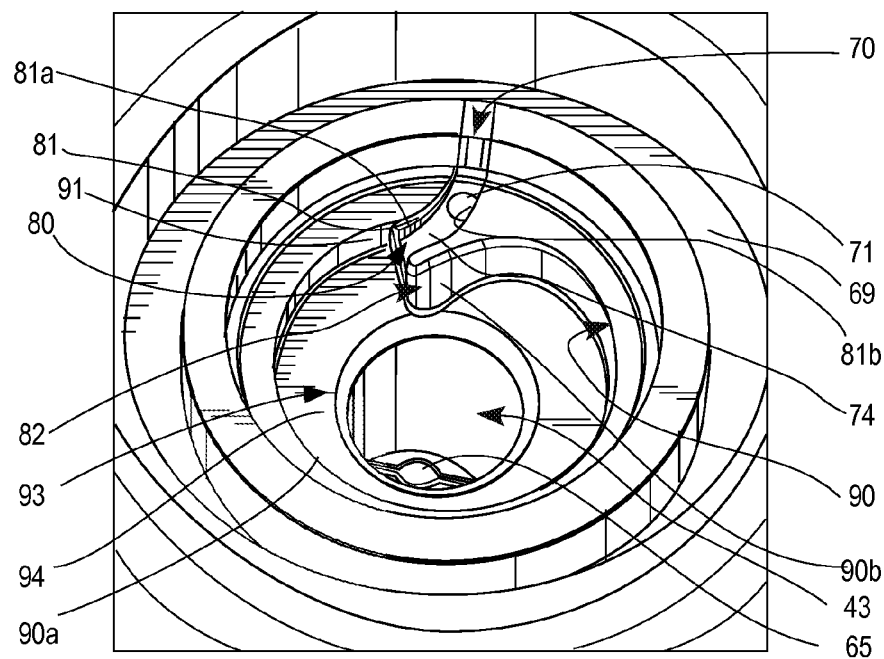
FIG. 9 is a perspective view of a portion of an interior of an embodiment of a cartridge according to the present invention.

FIG. 9 illustrates a portion of a beverage cartridge according to an embodiment of the present invention. Many of the features of the cartridge are the same as the cartridge of FIG. 1 and will not be described further in detail. For these features like numbering has been used. The eductor and the discharge spout of the cartridge according to the illustrated embodiments of the present invention have been redesigned to improve and/or control crema quality.

As shown in FIG. 9, the discharge region of the cartridge comprises an eductor channel 80, circulation chamber 93 and the discharge spout 43. The walls 81 of the eductor channel 80 both in the region of the air inlet 71 and downstream of the air inlet 71 are curved such that the beverage passing through the inlet aperture 128 of the eductor (formed from the slot 70 shown in the Figure as described above by the interaction of the slot 70 with the outer member 2) and along the channel 80 is forced through an angular deviation before entering circulation chamber 93. The circulation chamber 93 is formed by a region of the inner member having a bounding wall 90 and a sloping floor 94. The sloping floor 94 slopes inwardly and downwardly towards the discharge spout 43. The bounding wall 90 is generally spiral in shape having a portion 90*a* of generally circular shape extending through an angle of approximately 270 degrees from an exit point 82 of the eductor channel 80 and a portion 90*b* of decreasing radius of curvature where the bounding wall 90 curves inwardly traversing the sloping floor 94 to terminate adjacent the central opening of the discharge spout 43. The terminus of the bounding wall 90*b* is coincident with the exit point 82 of the eductor channel 80. Thus the bounding wall extends through 360 degrees in total.

The eductor channel 80 is defined by two curved eductor walls 81 marked in the Figures as first wall 81*a* and second wall 81*b*. The walls 81*a* and 81*b* extend from the region of the slot 70, past air inlet 71 to the exit point 82 of the channel 80. In the embodiment shown the walls 81 are curved in the opposite sense to the curve of the bounding wall 90 at the exit point 82, although this is not essential and alternative configurations may be adopted. The first wall 81*a* is positioned on the inside of the curve of the eductor channel 80 and is thus of a shorter length than the second wall 81*b*. In the embodiment shown, the curved walls 81 are concentric with a common radial centre and thus exhibit different radii of curvature, although this is not essential and alternative configurations may be adopted. In the illustrated embodiment, the radius of curvature of the centre line of the eductor channel is substantially 2.00 mm. In addition, the channel 80 enters the circulation chamber 93 in a tangential manner. The walls 81a and 81b or curved portions thereof can have a radius of curvature from 1.50 to 5.50 mm, from 2.00 to 3.00 mm, or substantially 2.50 mm.

In the embodiment shown, due to its curvature and configuration, the second wall 81b provides an impact surface substantially 1.23 mm along the centre line from the outlet of slot 70 through which the jet of beverage enters the eductor channel 80. The included angle of impact between the centre line along which a jet of beverage flows and the impact surface can be from 1 to 90 degrees, from 20 to 60 degrees, substantially from 36 to 39 degrees, or substantially 37.78 degrees.

A floor 74 of the eductor channel 80 is sloped downwardly towards the exit point 82 such that the height of the walls 81 of the eductor channel 80 increase from the entrance to the exit point 82 of the channel 80.

In the embodiment shown, the air inlet 71 is circular and has a diameter D. Alternatively, the air inlet may take any convenient shape, such as a D-shape or other convenient shape. The equivalent or effective diameter D of such a shape is calculated by taking the area A and determining D from $A=\Pi r^2$, where $D=2r$. The distance between the aperture 70 and the point of impact of the central region of the jet of beverage upon the impact surface can be from 0.1 D to 2.5 D, from 0.2 D to 1.5 D, or substantially 0.44 D.

Figure 12A:
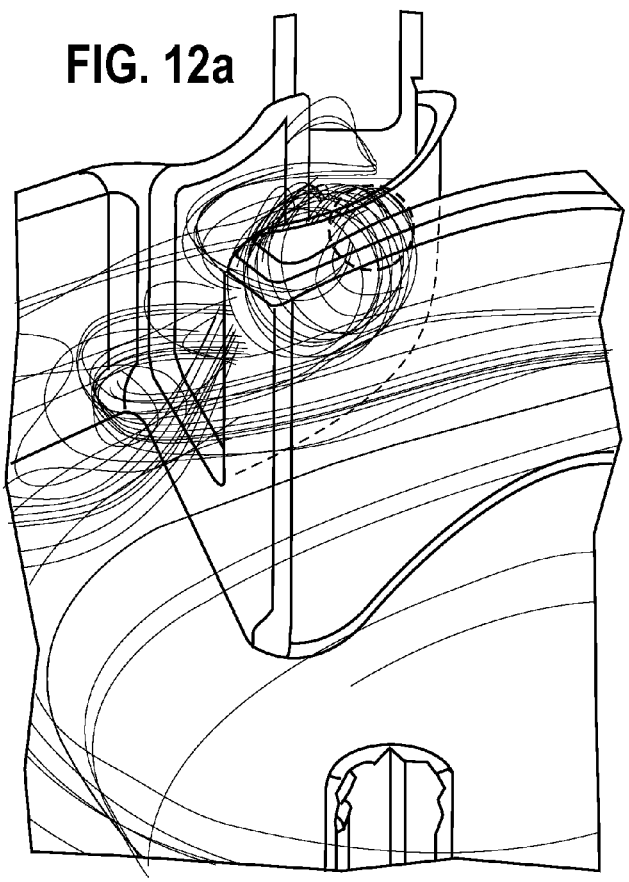
FIG. 12a is a diagram of a CFD analysis of flow within an eductor channel of the cartridge of FIG. 9.

In use, beverage is dispensed from the cartridge using a beverage machine as described above. However, the improved eductor and discharge spout region help improve and/or control the appearance and quantity of the crema generated. Beverage passing from the annular channel 69 is forced into a high velocity jet on passing through the aperture 128. The jet of beverage then passes over the air inlet hole 71 causing air bubbles to be drawn up and entrained into the flow. The beverage flow with air bubbles then directly impacts the second wall 81b of the eductor channel 80 near the outlet of the air hole 71 at a high velocity causing the flow to become highly turbulent and to fold over and circulate within the eductor channel 80 interacting significantly with the walls 81b and 81a before exiting at exit point 82. In addition, the impact of the jet on the walls of the eductor channel helps to complete entrainment of the air bubbles in the liquid and to break down larger bubbles even before the jet exits the confines of the eductor channel 80. Thus, the curved eductor channel 80 introduces an asymmetric nature to the flow dynamic. Also, since the eductor channel 80 is downwardly directed by virtue of the sloping floor 74 and the aperture 128 is located towards a top of the eductor channel 80, the asymmetric flow is encouraged to spiral within the eductor channel 80 as shown in the CFD diagram of FIG. 12a. This is in marked contrast to the computed flow pattern in the eductor channel of the cartridge of FIG. 1 shown in FIG. 12b where the flow is largely directed straight along the eductor channel without any significant vortexing, spiraling or asymmetry. This has a number of effects. The beverage in the curved eductor channel 80 interacts far more with the walls 81 of the channel than when the eductor channel is straight. This helps to mix the liquid and air phases of the beverage flow. Thus there is more opportunity for the bubble size within the flow to be reduced and/or maintained at its initially smaller size.

Figure 12B:
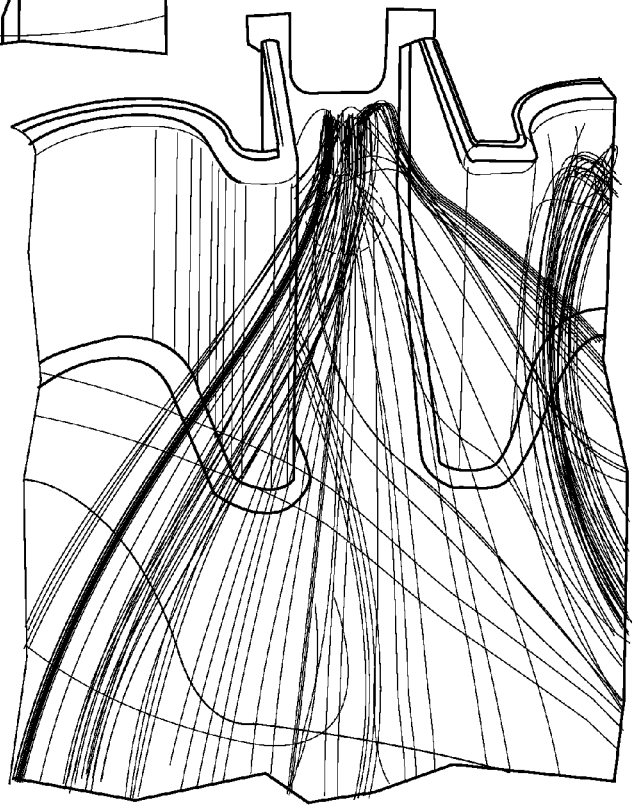
FIG. 12b is a diagram of a CFD analysis of flow within an eductor channel of the cartridge of FIG. 1.

With a straight eductor channel it can be seen from FIG. 12b that the flow in the centre of the eductor channel removed from the walls (where the air inlet 71 outputs) remains at a high velocity throughout the full length of the eductor channel. As a result the air bubbles emerging from the air inlet 71 tend to pass straight along the eductor channel with minimal interaction with the liquid phase of the beverage or with the eductor channel walls. This has the disadvantage of encouraging and/or providing an environment for bubble coalescence, increasing the size of bubbles in the flow of beverage. It has been found that the vortexing flow exiting the curved eductor channel 80 leads to a more reproducible crema from cartridge to cartridge of higher and/or controlled quality.

Figure 11A:
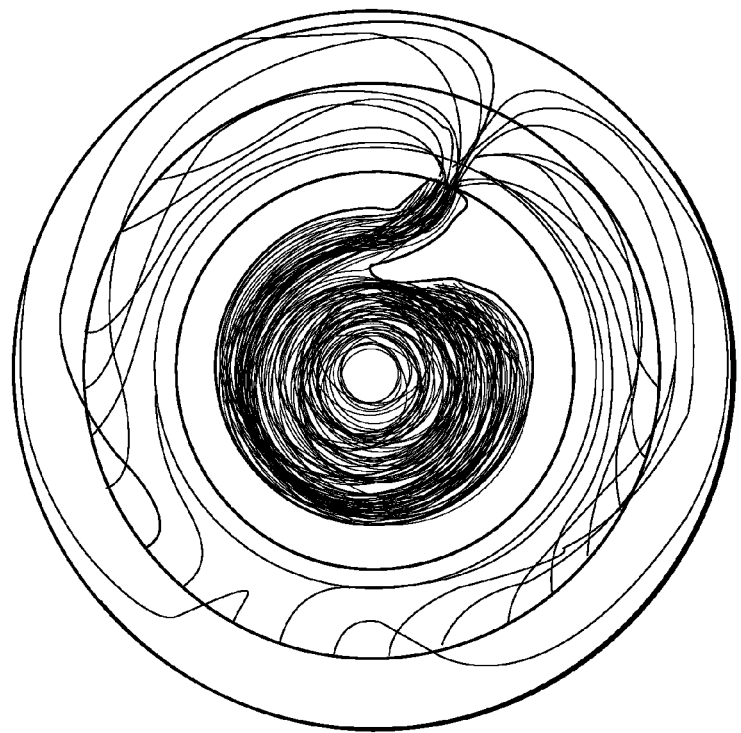
FIG. 11a is a diagram of a computational fluid dynamic (CFD) analysis of beverage flow within the portion of cartridge shown in FIG. 9.
Figure 11B:
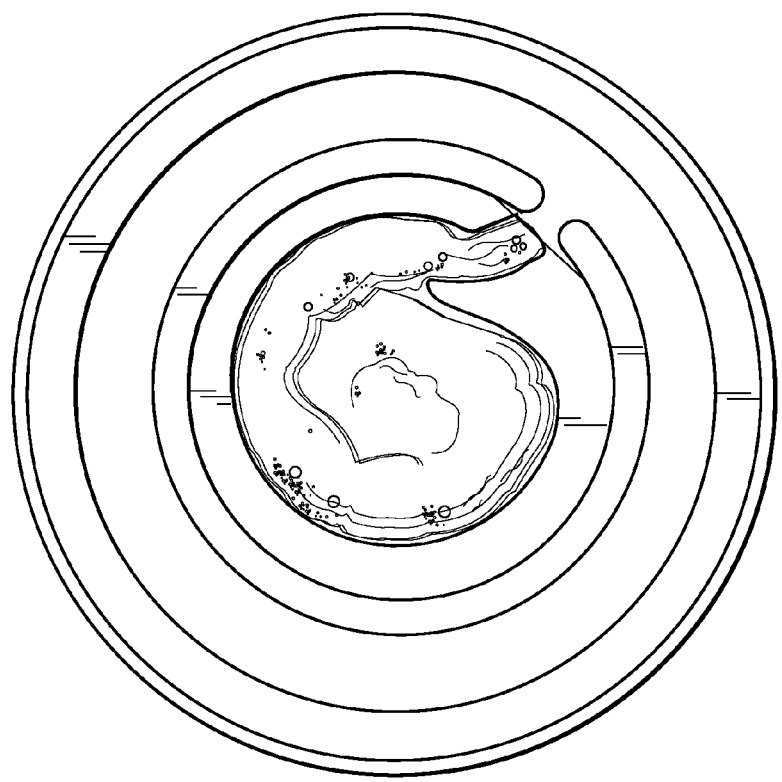
FIG. 11b is an illustration of beverage flow within the portion of cartridge shown in FIG. 9.

After exiting the curved eductor channel 80 the flow of beverage circulates within the circulation chamber 93 where it is encouraged by the bounding wall 90 into a flow pattern as shown in FIGS. 11a and 11b, wherein the flow rotates about the axis of the discharge spout 43 whilst at the same time descending the circulation chamber and spout towards the outlet such that the flow of beverage experiences centrifugal forces. The flow of beverage then exits into the discharge spout 43 and into the waiting cup or receptacle.

Figure 10A:
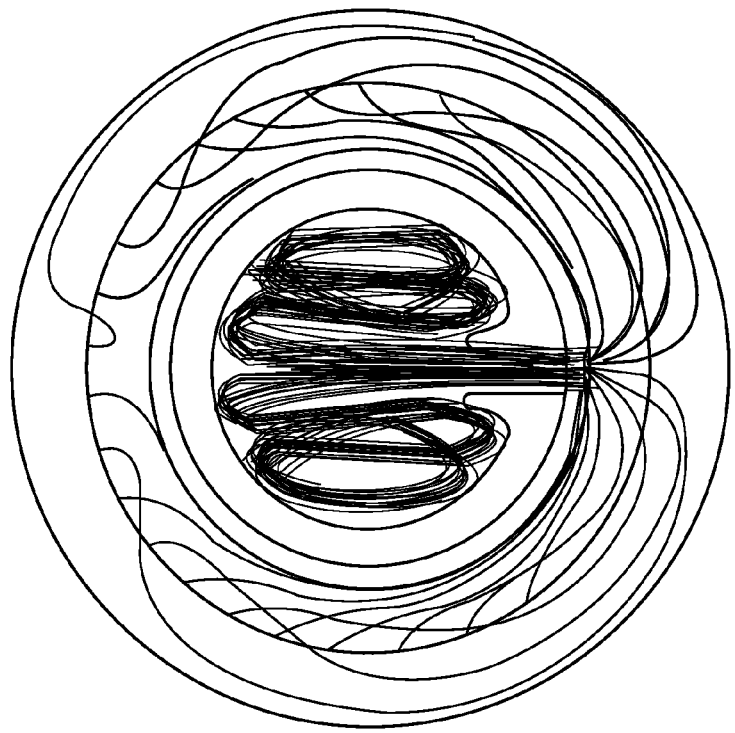
FIG. 10a is a diagram of a computational fluid dynamic (CFD) analysis of beverage flow within the portion of cartridge shown in FIG. 8.
Figure 10B:
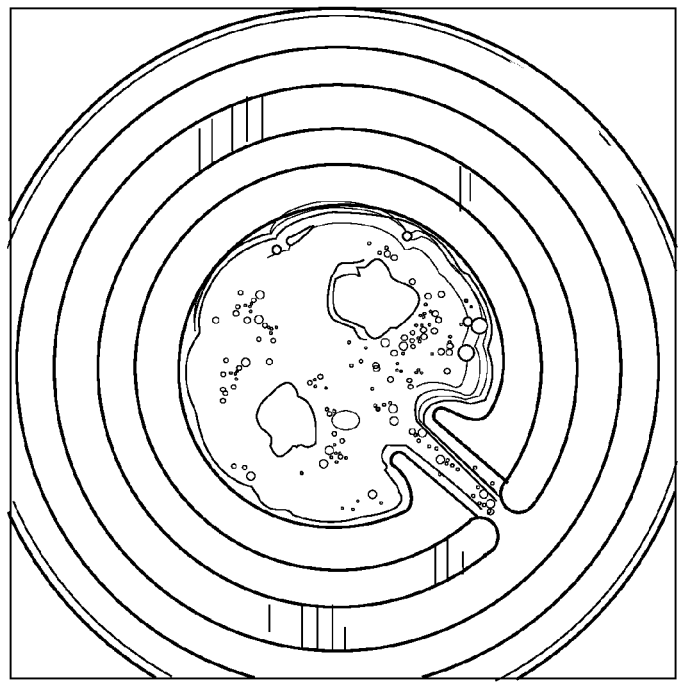
FIG. 10b is an illustration of beverage flow within the portion of cartridge shown in FIG. 8.

The flow of the beverage around the circulation chamber 93 helps to order the flow and maintain the structure of the flow prior to discharge through the spout 43. It has been found by experiment that in cartridges according to some embodiments of the invention, the non-linear entry of the beverage into the circulation chamber 93 allows larger air bubbles contained within the beverage to migrate towards the centre of the chamber 93, preferentially by traversing across the upper region of the chamber 93 whilst beverage containing smaller bubbles is circulated at the periphery of the chamber 93 nearer the bounding wall 90 and downwards towards the discharge spout 43. The larger bubbles are conveyed to the centre of the chamber 93 where they coalesce and then collapse. This is in marked contrast to the flow dynamic of the prior art cartridge of FIGS. 1 to 8 as shown in FIGS. 10a and 10b where the flow pattern within and directly above the discharge spout 43 has much larger bubble sizes wherein the larger bubbles tend to recirculate and are dispensed as part of the crema of the beverage.

It has also been found by experiment that the use of a curved eductor together with a circulation chamber downstream of the eductor channel allows for the eductor to entrain air and control bubble size whilst the circulation chamber helps to grade bubble size within the flow but without any significant additional entrainment of air. In tests, the cartridge of FIG. 9 was tested but with the eductor air inlet 71 blocked off. The results showed that a fine crema was not produced simply by means of the presence of the circulation chamber. In other words bubble entrainment was not occurring in the circulation chamber 93. This was also shown using CFD models.

A number of models of cartridge having eductor channels of differing degrees of curvature were prepared. An experiment was then conducted to compare the performance of a straight eductor channel against the several designs of curved eductor. The results are shown in Table 1a, with reference to FIGS. 13a to 17b. The distance from the aperture 70 to the point of impact of a central region of the jet of beverage upon the impact surface can be from 0.60 to 7.80 mm, from 0.87 to 2.08 mm, or substantially 1.23 mm.

TABLE 1a

Figure 13A:
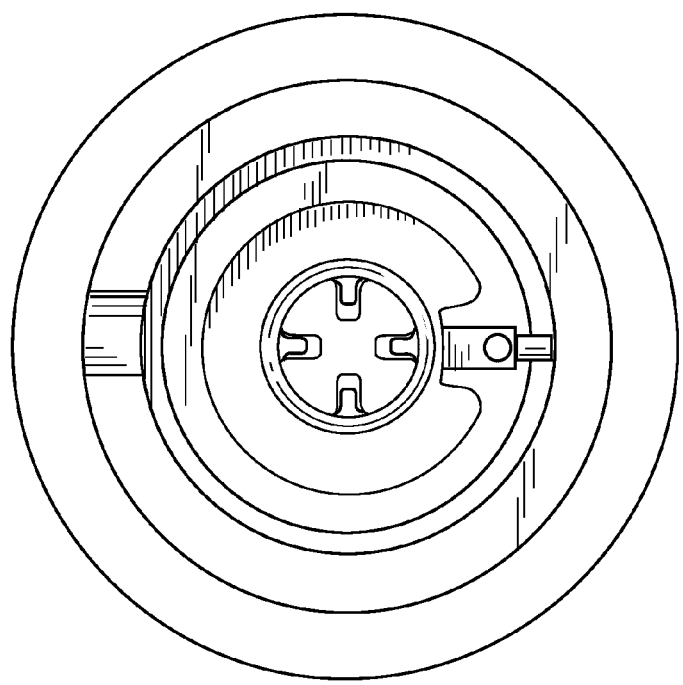
FIG. 13a is a schematic top plan view of a portion of an interior of the cartridge of FIG. 1 (provided with four ribs according to an embodiment of the present invention)
Figure 13B:
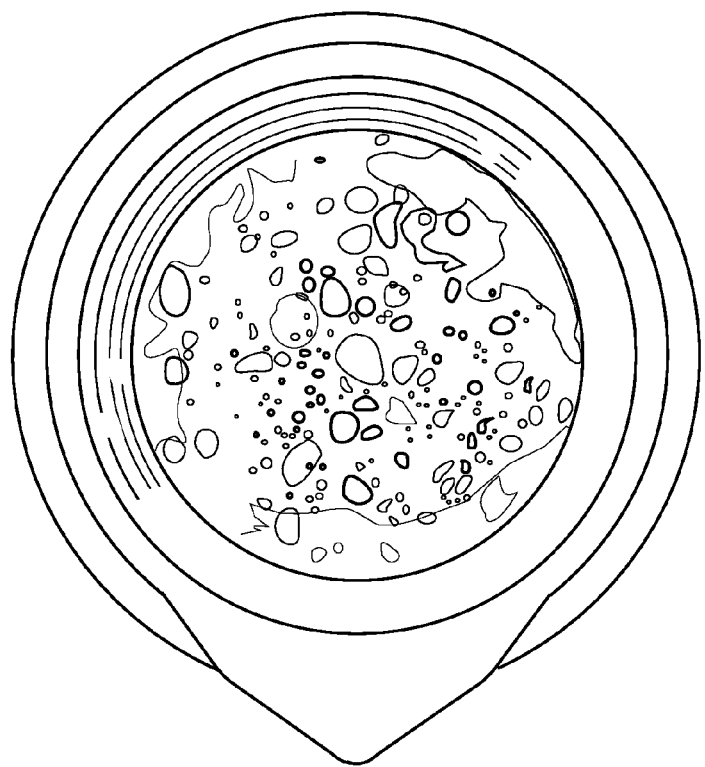
Figure 14A:
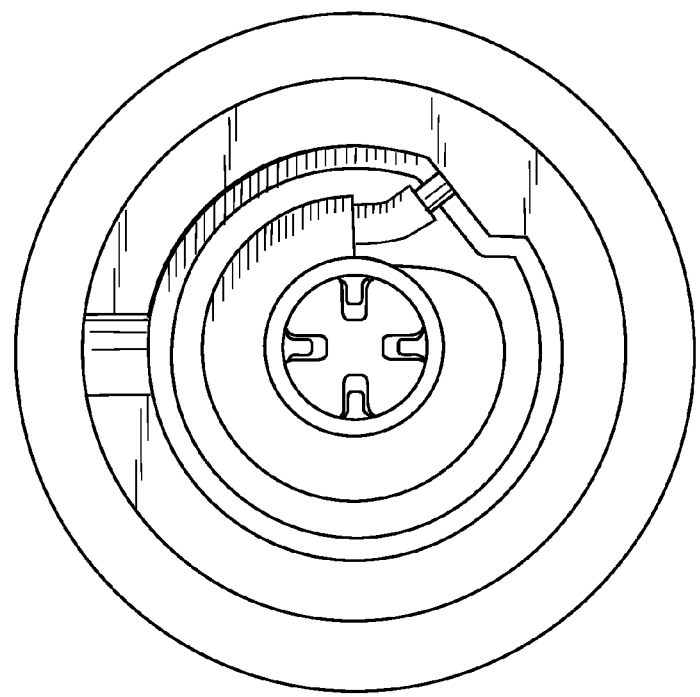
FIG. 14a is a schematic top plan view of a portion of an interior of a cartridge according to a first embodiment of the present invention.
Figure 14B:
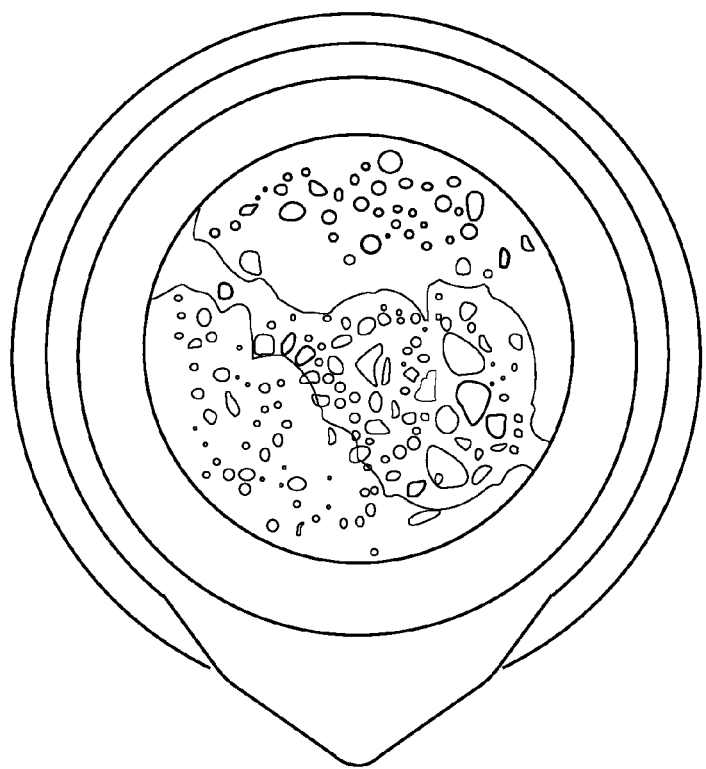
Figure 15A:
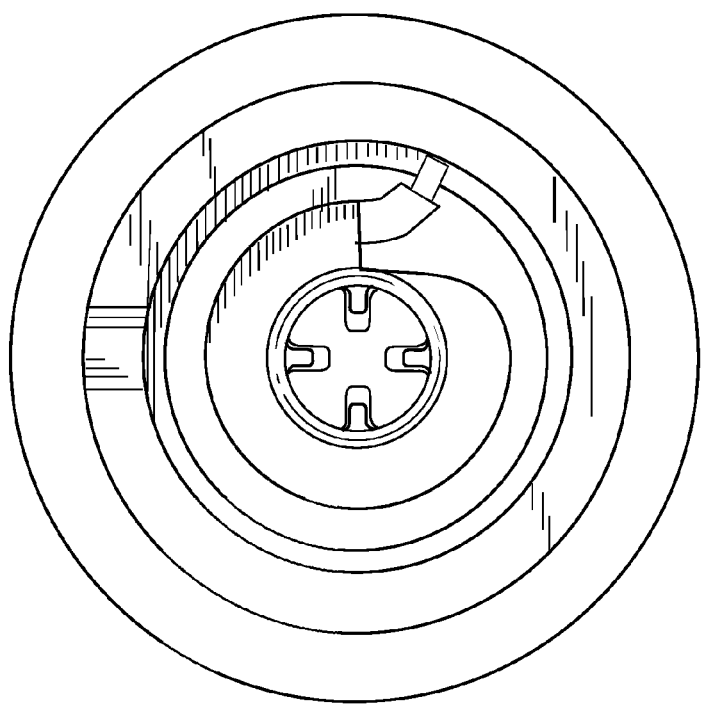
FIG. 15a is a schematic top plan view of a portion of an interior of a cartridge according to a second embodiment of the present invention.
Figure 15B:
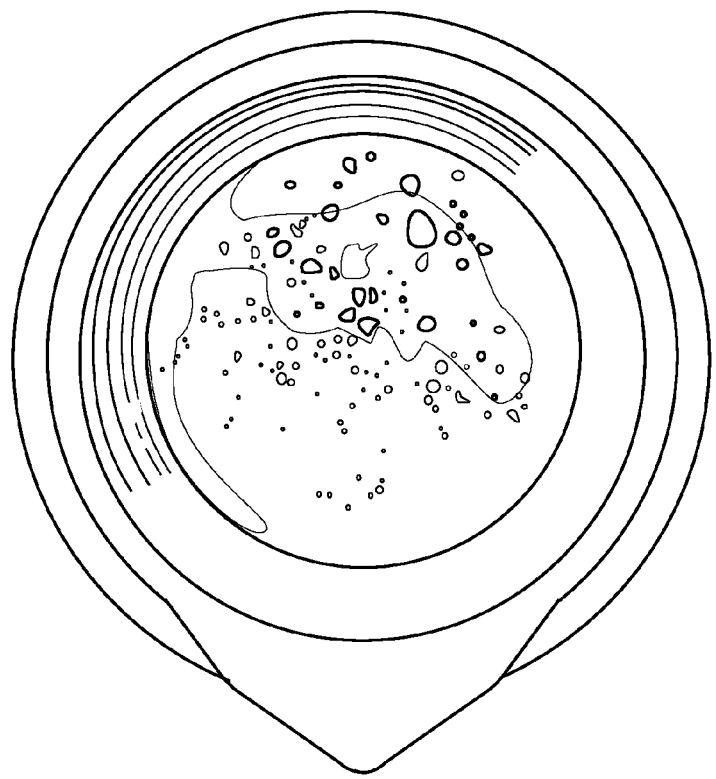
Figure 16A:
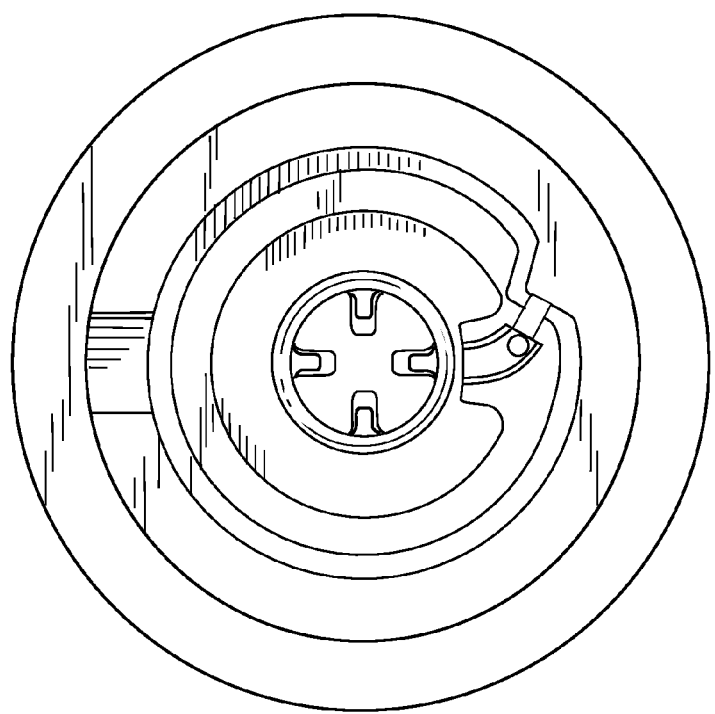
FIG. 16a is a schematic top plan view of a portion of an interior of a cartridge according to a third embodiment of the present invention.
Figure 16B:
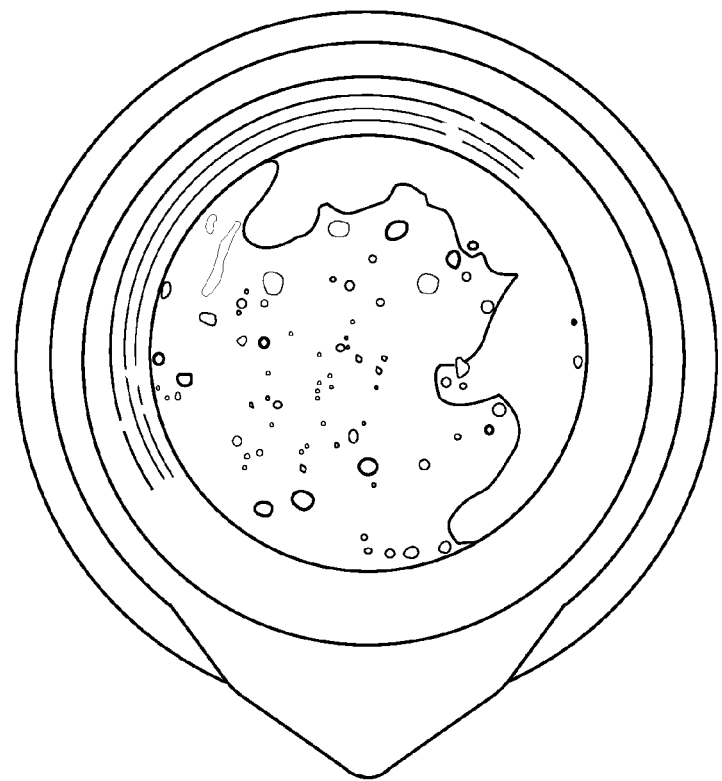
Figure 17A:
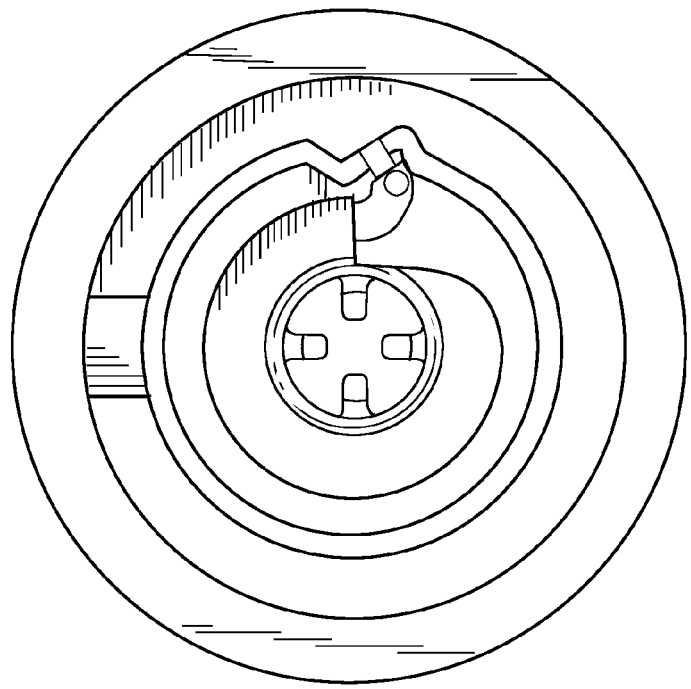
FIG. 17a is a schematic top plan view of a portion of an interior of a cartridge according to a fourth embodiment of the present invention.
Figure 17B:
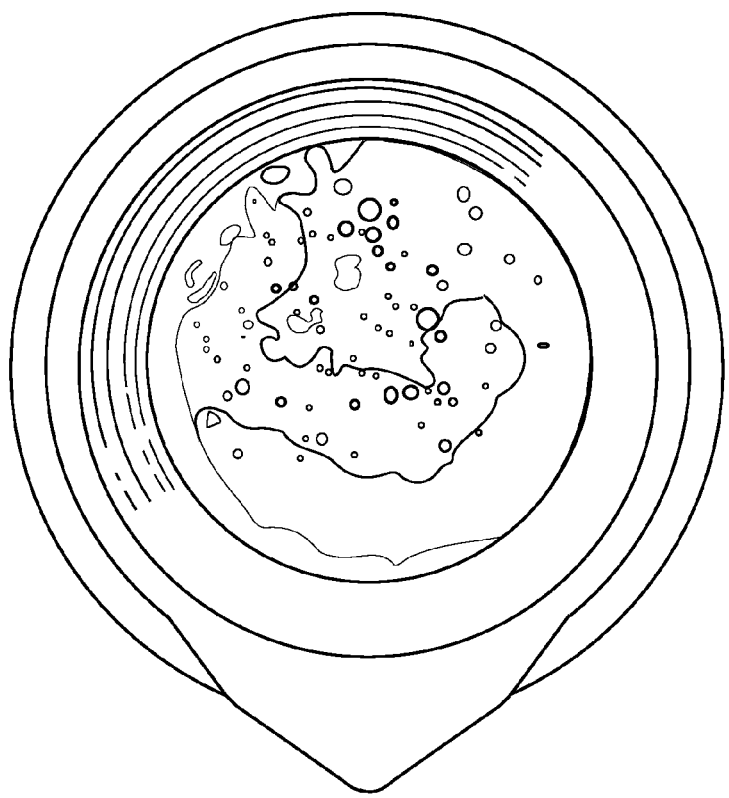

| Eductor Geometry | | Distance from aperture 70 to impact point of jet | Angle of impact against eductor wall | Test no. | Foam rating (0 = poor, 5 = Excellent) | Foam volume (ml) | Comments |
|---|---|---|---|---|---|---|---|
| Straight eductor, Normal (centre) entry | | 7.8 mm* | N/A | 1 | 3 | 15 | See FIGS. 13a and 13b. Coarse foam, not very stable. |
| | | | | 2 | 2.5 | 20 | |
| | | | | 3 | 2 | 18 | |
| | | | | Average | 2.5 | 17.7 | |
| Curved eductor A (radius 4.0 mm) Tangential entry | | 1.66 mm | 29.3° | 1 | 3 | 18 | See FIGS. 14a and 14b. Coarse to medium foam, relatively stable. |
| | | | | 2 | 2 | 23 | |
| | | | | 3 | 3 | 20 | |
| | | | | Average | 2.7 | 20.3 | |
| Curved eductor B (radius 2.5 mm) Tangential entry | | 1.23 mm | 3.78° | 1 | 3 | 18 | See FIGS. 15a and 15b. Medium to fine stable foam. |
| | | | | 2 | 3.5 | 23 | |
| | | | | 3 | 3.5 | 16 | |
| | | | | Average | 3.3 | 19.0 | |
| Curved eductor B (radius 2.5 mm) Normal (centre) entry | | 1.2 mm | 36.9° | 1 | 4 | 18 | See FIGS. 16a and 16b. Fine to very fine stable foam. |
| | | | | 2 | 3.5 | 12 | |
| | | | | 3 | 4.5 | 15 | |
| | | | | Average | 4.0 | 15.0 | |
| Curved eductor C (radius 1.5 mm) Tangential entry | | 0.87 mm | 51.4° | 1 | 3.5 | 15 | See FIGS. 17a and 17b. Fine to very fine stable foam. |
| | | | | 2 | 4 | 14 | |
| | | | | 3 | 4 | 16 | |
| | | | | Average | 3.8 | 15.0 | |

*Note: jet impact of straight eductor is against opposite side of outlet chamber, not against eductor channel wall.

All models were constructed as full-size stereolithography (SLA) prototypes, therefore the results of crèma obtained give a comparative reading but are not typical of the better performance achieved in the finalised design implemented as a plastic injection moulding for production. The result of this finalised design is shown in Table 1b, along with an illustration (FIG. 20) of the crema result achieved.

TABLE 1b

Figure 20:
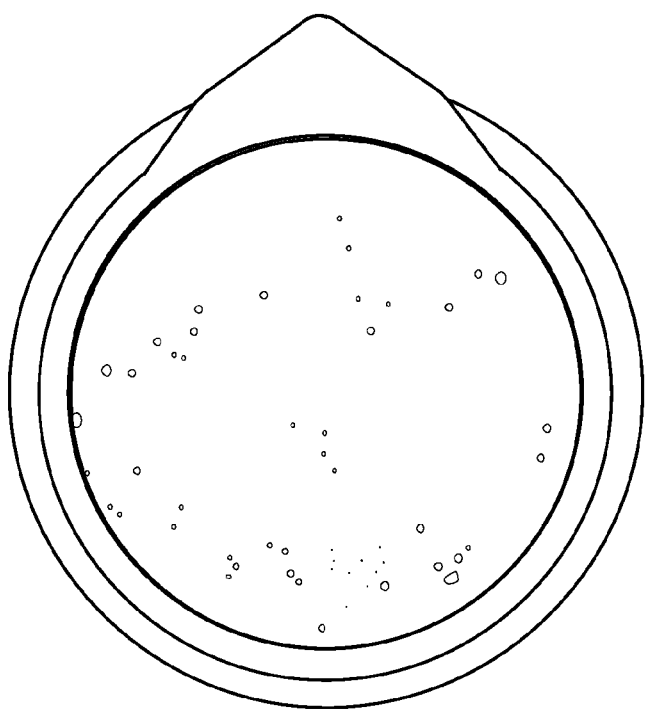
FIG. 20 is an illustration of the crema result achieved using a model cartridge as disclosed in Table 1b.
Figure 21A:
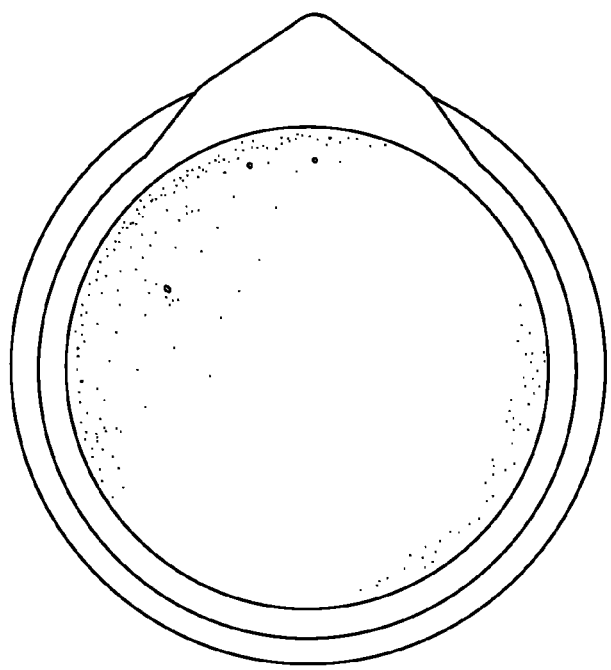
FIGS. 21a-21k are illustrations of the bubble size rating scale standards used in evaluating foam.
Figure 21B:
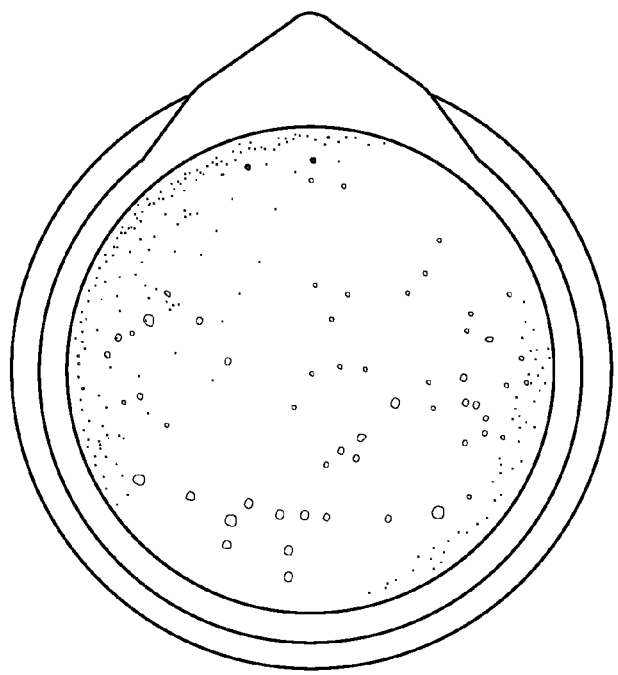
Figure 21C:
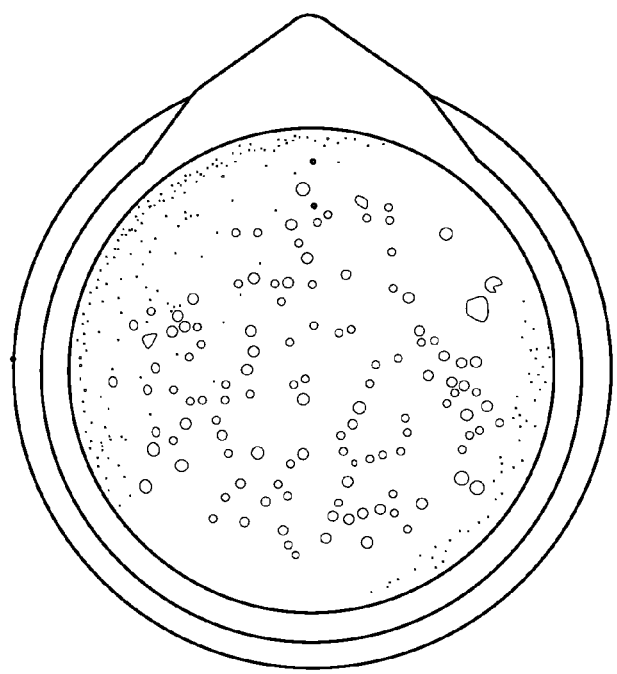
Figure 21D:
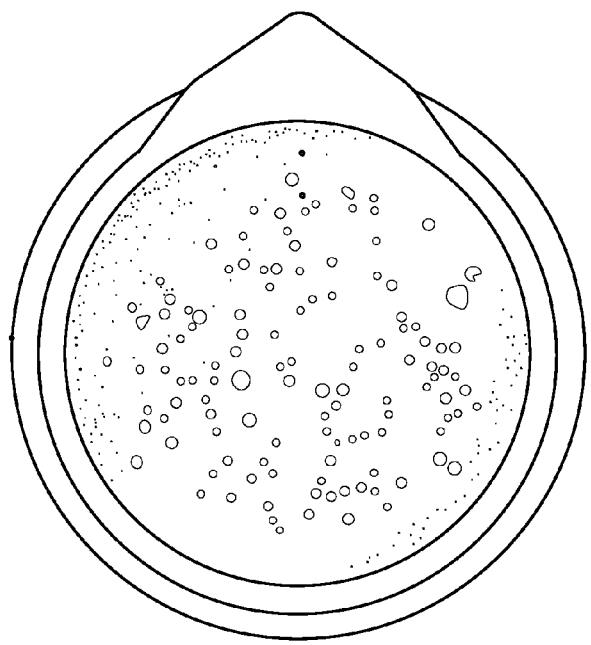
Figure 21E:
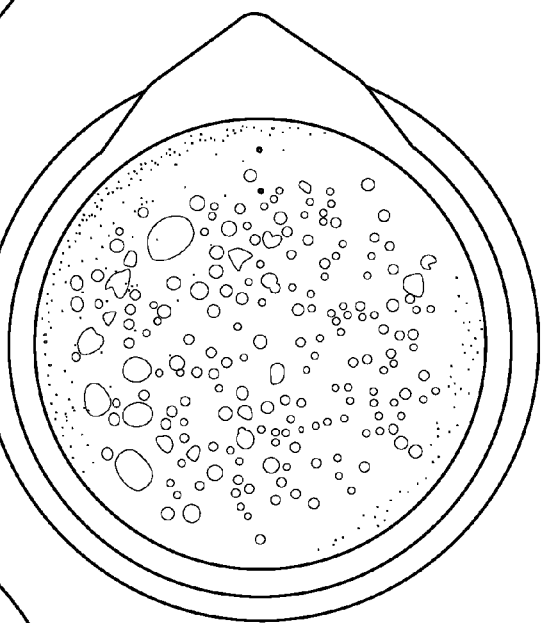
Figure 21F:
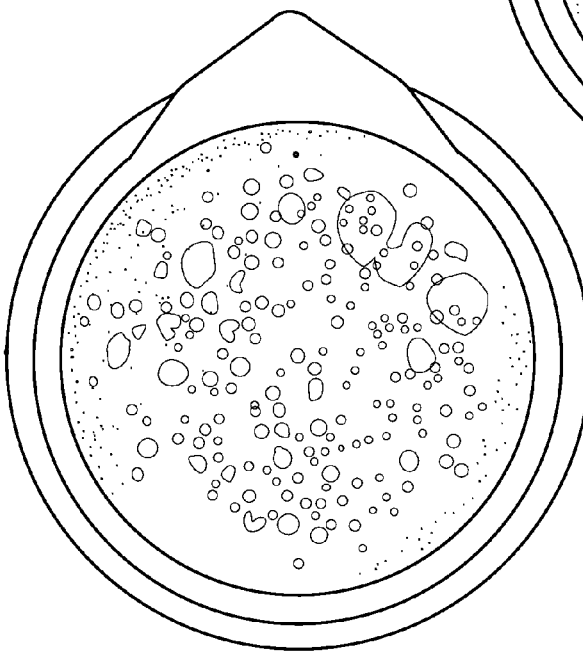
Figure 21G:
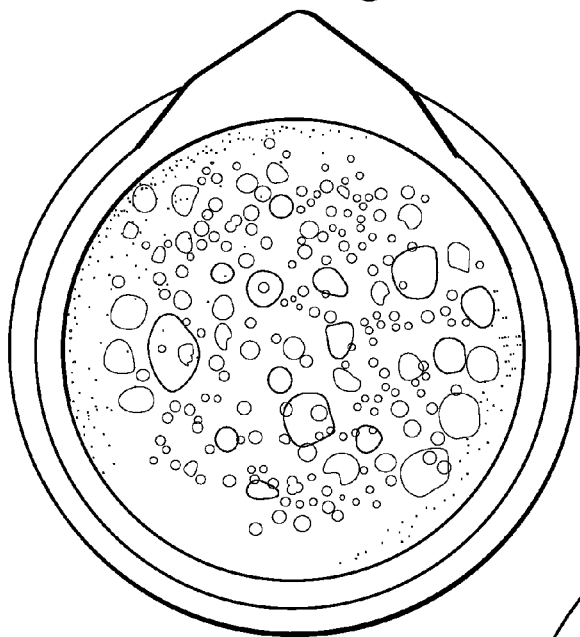
Figure 21H:
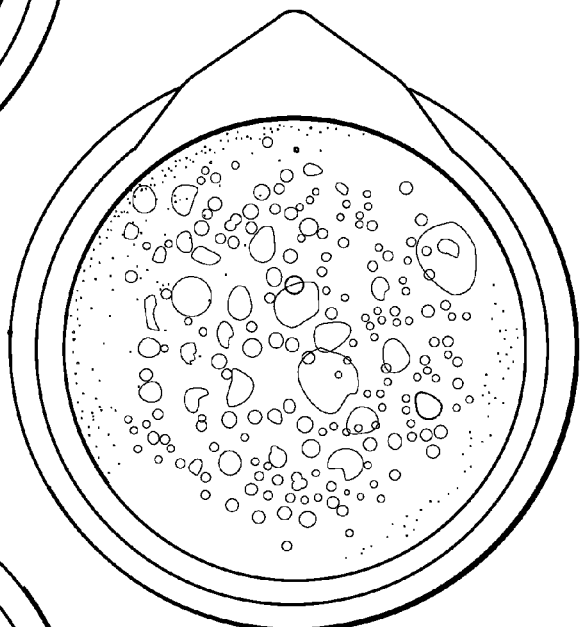
Figure 21:
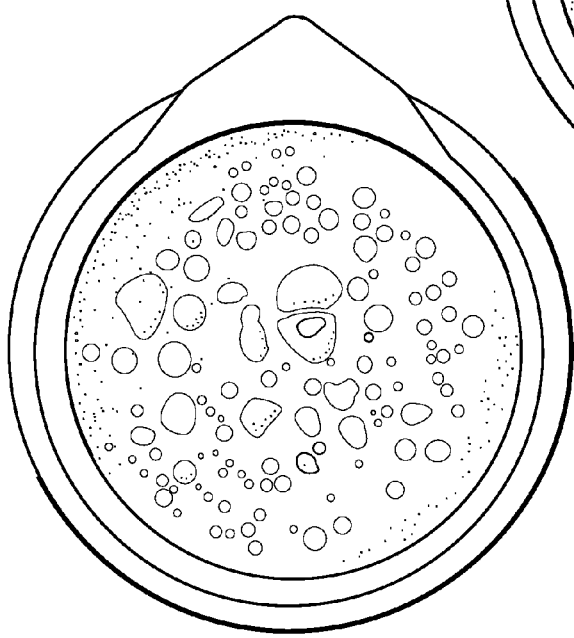
Figure 21J:
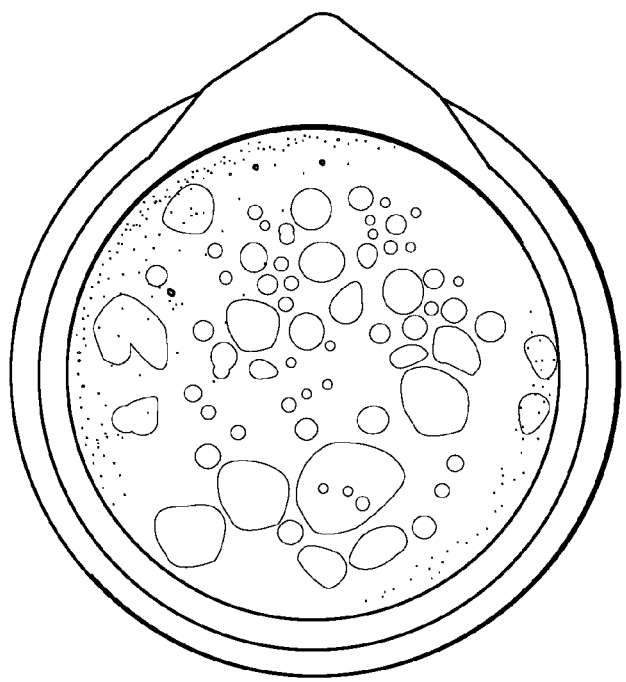
Figure 21K:
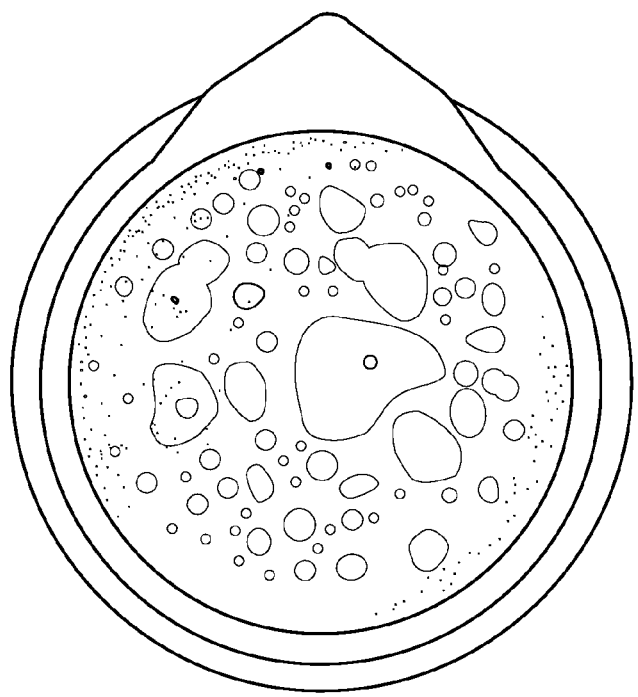
Figure 22A:
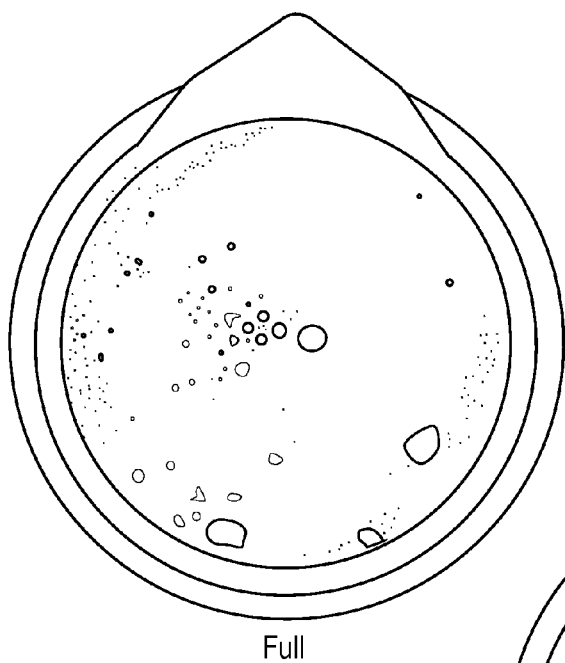
FIGS. 22a-22e are illustrations of the foam coverage scale standards used in evaluating foam.
Figure 22B:
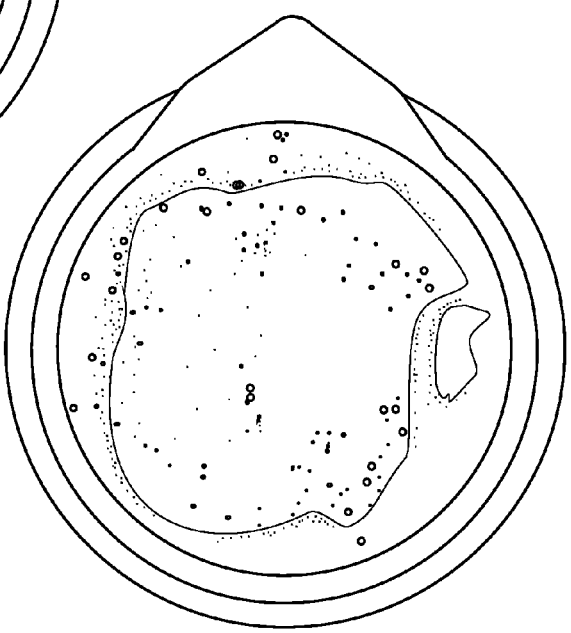
Figure 22C:
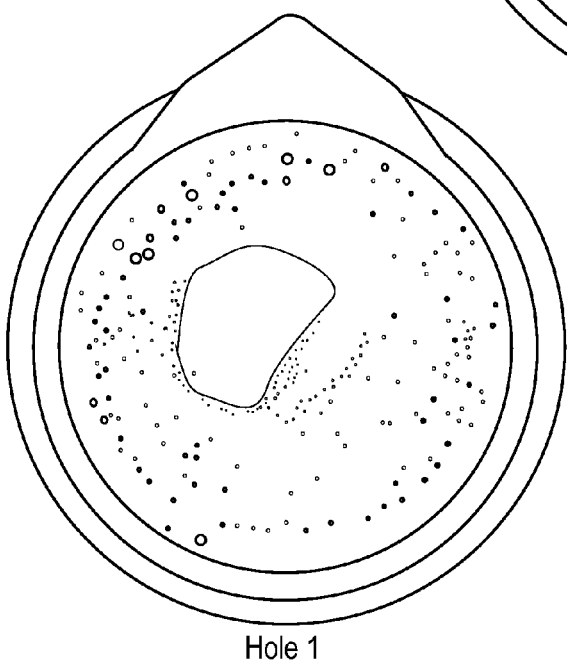
Figure 22D:
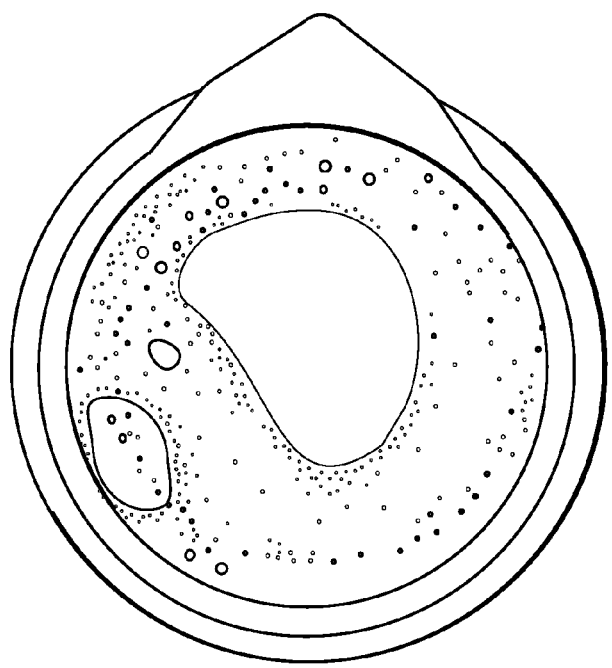
Figure 22E:
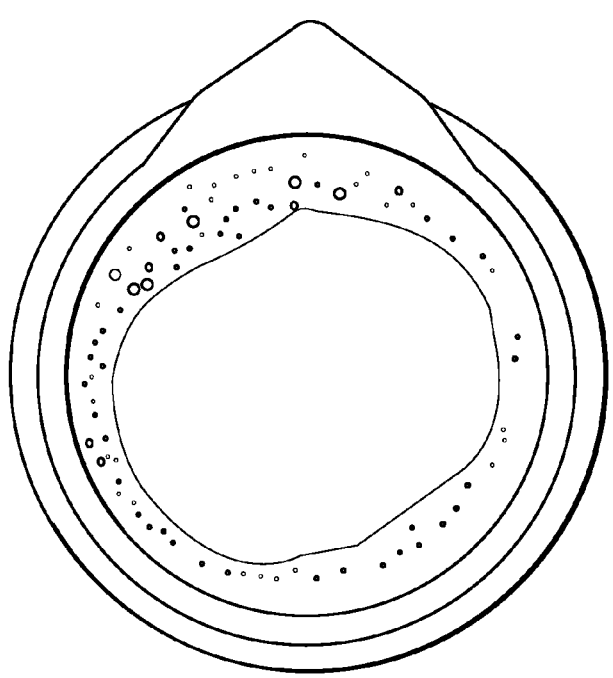
Figure 23A:
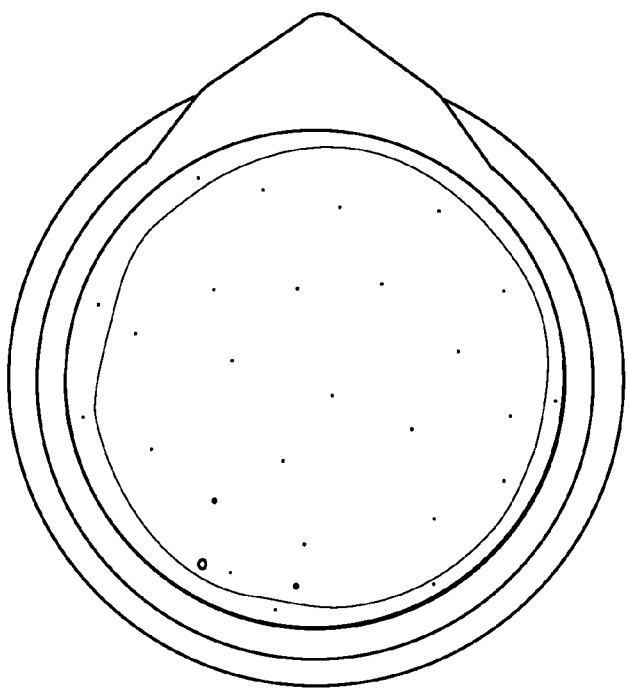
FIGS. 23a-23d are illustrations of a target appearance for various beverage types.
Figure 23B:
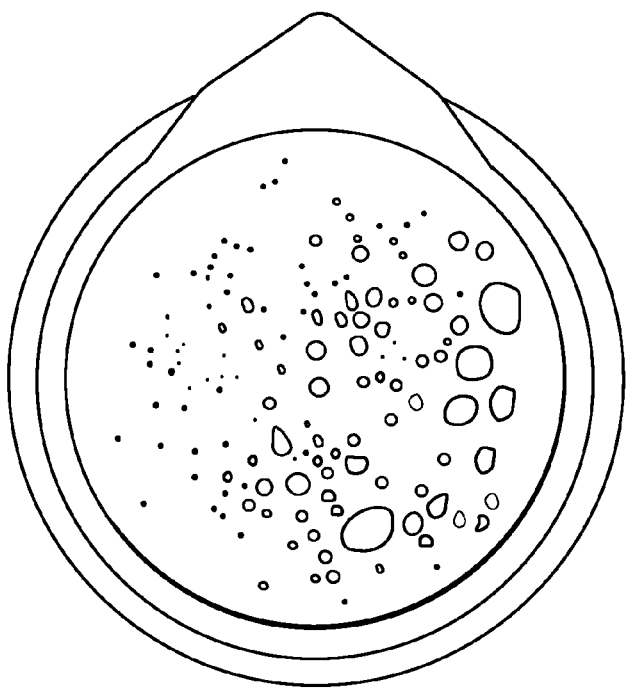
Figure 23C:
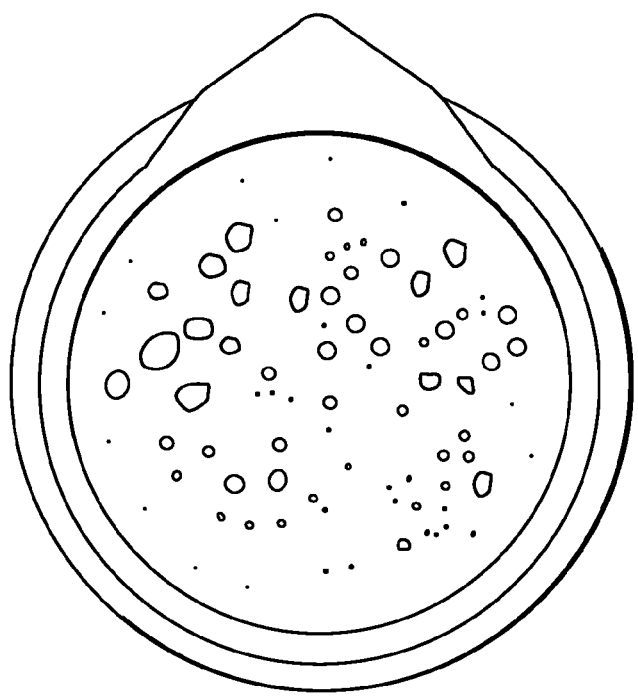
Figure 23D:
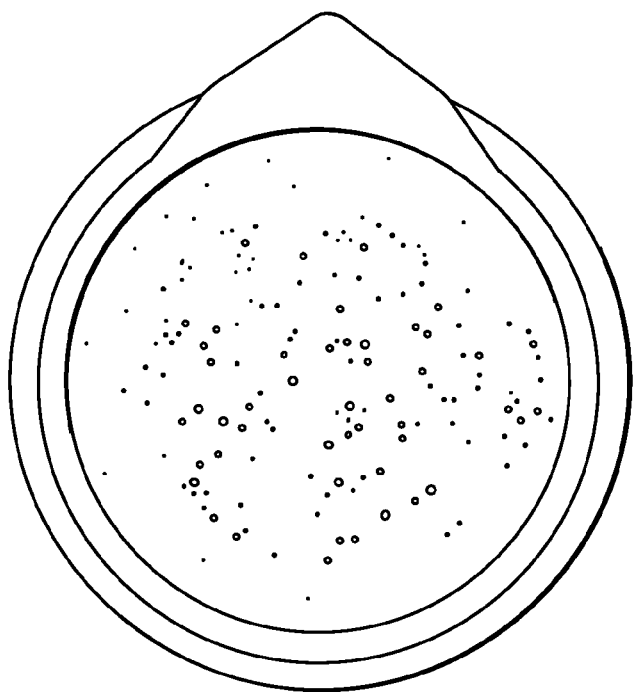

| Production Eductor Geometry | | Distance from aperture 70 to impact point of jet | Angle of impact against eductor wall | Test no. | Foam rating (0 = poor, 5 = Excellent) | Foam volume (ml) | Comments |
|---|---|---|---|---|---|---|---|
| Curved eductor B (radius 2.5 mm) Tangential entry | | 1.23 mm | 37.8° | 1 | 4.25 | 5 | See FIG. 20. Extremely fine and stable foam. |
| | | | | 2 | 4.75 | 5 | |
| | | | | 3 | 4.75 | 5 | |
| | | | | Average | 4.6 | 5.0 | |

For each eductor geometry, the distance from the outlet of aperture 70 along the centre line to impact point of jet (mm), angle of impact against eductor wall (degrees), test no., foam rating (0=poor, 5=excellent), foam volume (ml) and comments are stated. The foam rating is an incremental eleven point scale as typically applied to coffee beverages, from 0 to 5 in 0.5 increments, assessed visually according to bubble size rating scale standards illustrated in FIGS. 21*a*-21*k* and the foam coverage scale standards illustrated in FIGS. 22*a*-22*e*.

The experimental results show that the quality of crèma increases with an increase in the degree of curvature of the eductor channel. This is also accompanied by a slight reduction in the quantity of crèma produced.

The applicant has found that by optimising one or more of a number of parameters of, or within, the eductor channel, an improvement (or controlled reduction) in the quality of crema can be obtained. For example, the results illustrate the beneficial effects achieved when adjusting the radius of curvature of the eductor (and walls of the eductor), impact surface angle, and distance of jet from aperture to impact surface. In addition, the applicant has found beneficial effects from controlling operating parameters within the eductor channel such as the position and distance of the air inlet along the eductor channel, fluid velocity (such as from 1.25 to 100 m/s, from 6.90 to 35.00 m/s, or substantially 17.13 m/s), amount of air entrained (such as an average air inclusion flow rate into the eductor from 333 mm$^3$/s to 13,333 mm$^3$/s, from 667 mm$^3$/s to 6,667 mm$^3$/s, or substantially 1,233 mm$^3$/s), and potential power dissipation (such as the potential power dissipation of the jet of beverage on impact with the impact surface from 0.002 to 15 W, from 0.1 W to 5.0 W, or substantially 0.34 W). A jet (at a velocity of 17.13 m/s) impacting on the outside wall of the curved eductor channel in close proximity to the air inlet has proved particularly beneficial to the quality of crema obtained.

In contrast, the jet of beverage in the straight eductor passes over the air inlet, along the eductor channel and into the outlet chamber without impacting on the eductor channel walls. This causes a greater amount of air entrainment in the eductor channel, but with poorer mixing action of the air/water phases of the beverage in the outlet chamber.

Conversely, with a curved eductor, as the degree of curvature increases (with all other features held the same) then the angle of jet impact against the wall increases and the impact point moves closer to the jet aperture and air inlet hole. As the jet impacts on the wall, it undergoes a change in shape and direction which promotes better turbulent shearing and mixing action of the air/water phases in the eductor channel. Also, as the impact point becomes closer to the air inlet then the amount of air entrained is reduced due to reflected back pressure. The applicant believes that the reduced quantity of air entrained, combined with more efficient mixing and turbulent shearing, results in the observed finer crèma. Conversely, with less efficient mixing, lower turbulent shearing or less separation of larger bubbles, a crema with larger bubbles may be formed.

It will be appreciated by those skilled in the art that many alternatives to the preferred embodiments described are possible. For example, although the eductor designs presented above are curved, they could take any form that causes the beverage to be forced through an angular deviation within the eductor (e.g. a dog leg or labyrinthine form). In addition, the pressure differentials set up in the eductor can determine the appropriate positioning of the air inlet so as to control the amount of air inducted and entrained in the beverage. It will be appreciated also that any one or more of the length, height, cross-sectional and/or longitudinal shape and/or area, or volume of the eductor may be varied, as may the positioning of the air inlet, the cross sectional area and/or shape of the air inlet, the area and/or angle and/or distance from the aperture of the impact surface. Furthermore, the velocity of the jet of beverage and the pressure profiles in the eductor may be varied. These variations enable the eductor of a beverage cartridge to be optimised according to the type, quality and quantity of crema desired for a given beverage type.

As a result, cartridges can have eductor designs tailored dependent upon the type of crema desired to be produced with a particular beverage. An example of how to characterise crema by beverage type is described in Table 2 and illustrated in FIGS. 23*a*-23*d*.

TABLE 2

| DRINK | FOAM DESCRIPTION | BUBBLE SIZE (mm) | FOAM QUANTITY (ml) | TARGET APPEARANCE |
|---|---|---|---|---|
| Espresso | Uniform, tiny, virtually-indistinguishable bubbles with 1-2 small bubbles. Full surface coverage of stable foam. Colour & marbling not specified | 80% <0.5 20% 0.5-1.5 | 5-20 (9-25% total coffee) | See FIG. 23a |
| Café Crema | Mixed small, medium & 1-2 open large bubbles. Full surface coverage of stable foam. | 25% <1.0 60% 1-1.5 15% 1.5-5.0 | 15-25 (10-20% total coffee) | See FIG. 23b |
| Cappuccino | Mixed small, medium & 1-2 open large bubbles. Full surface coverage of stable foam. Slightly resistant to deformation in stirring with a spoon. | 25% <1.0 60% 1-1.5 15% 1.5-5.0 | 40-70 (40-55% total milk) | See FIG. 23c |
| Latte | Uniform, tiny, bubbles with 1-2 small bubbles. Full surface coverage of stable foam. | 80% <0.5 20% 0.5-1.5 | 20-40 (15-25% total milk) | See FIG. 23d |

Once the desired crema has been formed in the beverage using a suitably optimised eductor channel, it is important to control the onward path of the beverage through the cartridge to the outlet so as to eliminate or reduce as far as possible any deterioration of the crema.

As mentioned above, upon exit from the eductor channel, the circulatory flow of the beverage around the circulation chamber helps to increase the robustness of the flow structure of the beverage prior to discharge through the spout, maintaining as far as possible the quality and quantity of crema.

Figure 18:
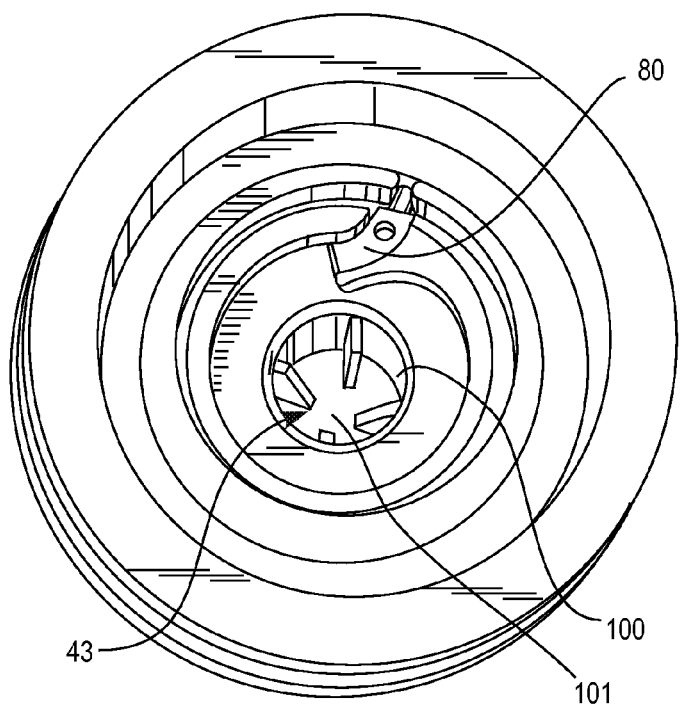
FIG. 18 is a perspective view of a portion of an interior of a fifth embodiment of cartridge according to the present invention.
Figure 19:
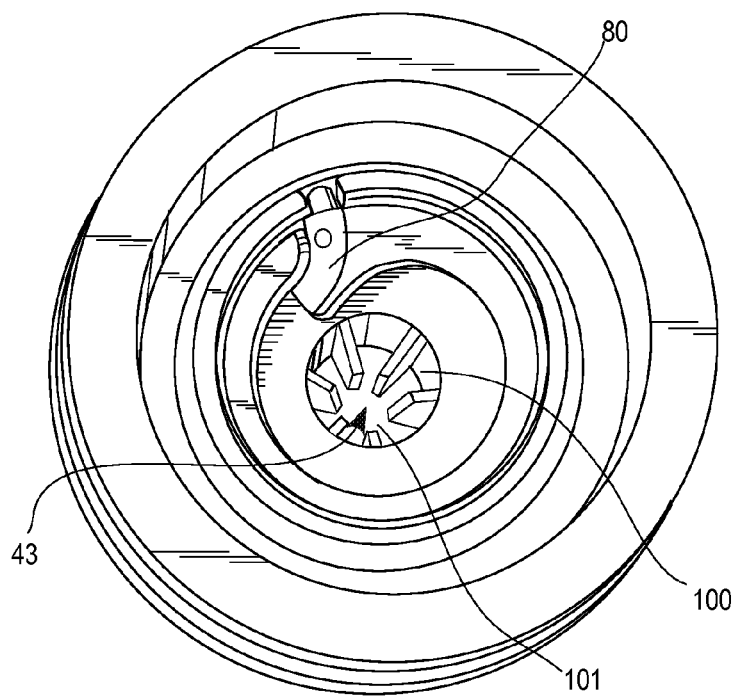
FIG. 19 is a perspective view of a portion of an interior of a sixth embodiment of cartridge according to the present invention.

In order to control the beverage on issue from the outlet spout of the cartridge, control fins are beneficially employed. FIGS. 18 and 19 illustrate further embodiments of cartridges incorporating control fins.

In FIG. 18, as with the first embodiment of cartridge of FIG. 9, the cartridge is provided with an eductor having a curved eductor channel 80 that opens tangentially into the chamber defining the circulation chamber 93. However, in this embodiment the discharge spout 43 is provided with four ribs or fins 100. The fins 100 are orientated longitudinally along the spout 43 and are equi-spaced around the spout's circumference. Each fin 100 extends part way towards the centre of the spout 43 such that a central opening 101 or free region is maintained within the spout 43. Each fin 100 is shown tapered so as to have a triangular shape in elevation with the distance of the fin from the wall of the spout 43 increasing as one travels down the spout 43. It is important that each fin 100 is of tapered shape so as to arrest the circulation gradually. It has been found in use that the presence of the fins 100 greatly improves the delivery of the beverage into the waiting receptacle. In particular, the cartridge with the fins 100 issues a stream of beverage which is more tightly controlled and results in less splashing. An advantage over prior art designs is that the fins 100 avoid the production of an expanding conical spray of beverage from the cartridge which can lead to beverage missing the intended receptacle and can also lead to disruption of any crema present on the beverage in the receptacle.

FIG. 19 illustrates a further embodiment of cartridge which is similar to that shown in FIG. 18. In this embodiment six fins 100 are provided on the discharge spout wall equi-spaced around the circumference. The fins 100 are trapezoidal in shape in elevation.

A number of models (examples of which are shown in FIGS. 24 and 25a-25g) were tested with differing rib configurations. The results are discussed in Table 3 and the resultant foam is illustrated in FIGS. 26a-26g.

TABLE 3

Figure 24:
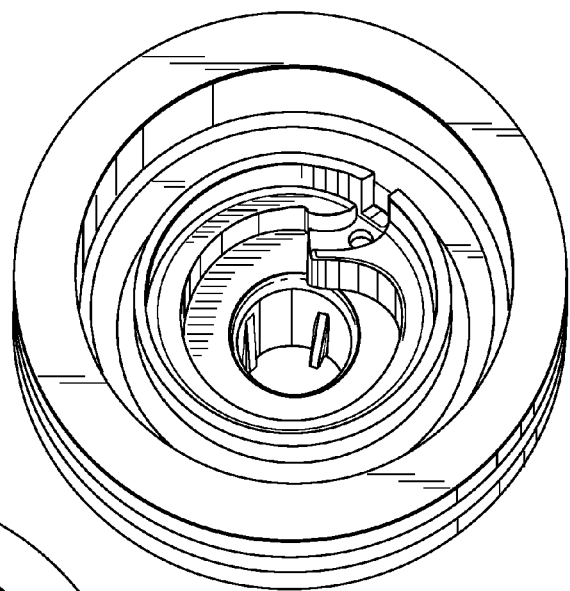
FIG. 24 is a perspective view of an interior of a cartridge as discussed in Table 3.
Figure 25A:
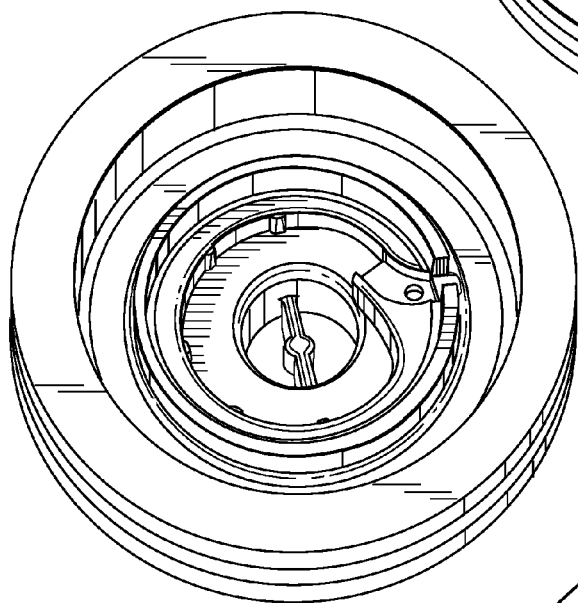
FIGS. 25a-25g are perspective views of interiors of cartridges as discussed in Table 3.
Figure 26A:
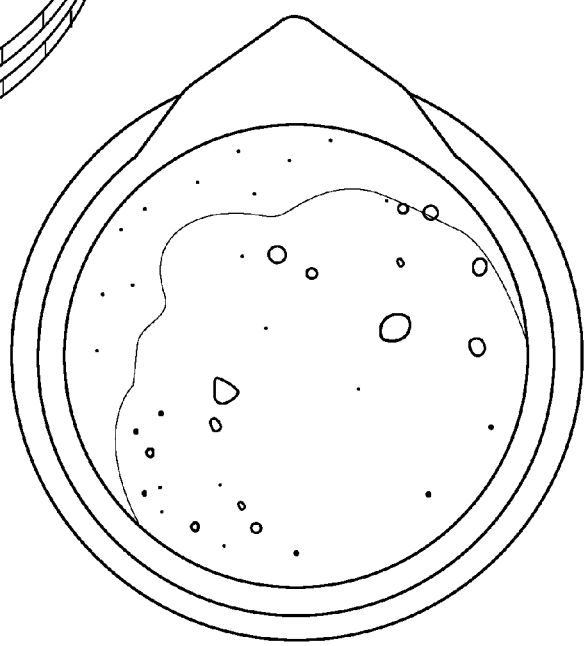
FIGS. 26a-26g are illustrations of a crema formed on beverages produced using the cartridges of FIGS. 25a-25g respectively.
Figure 25B:
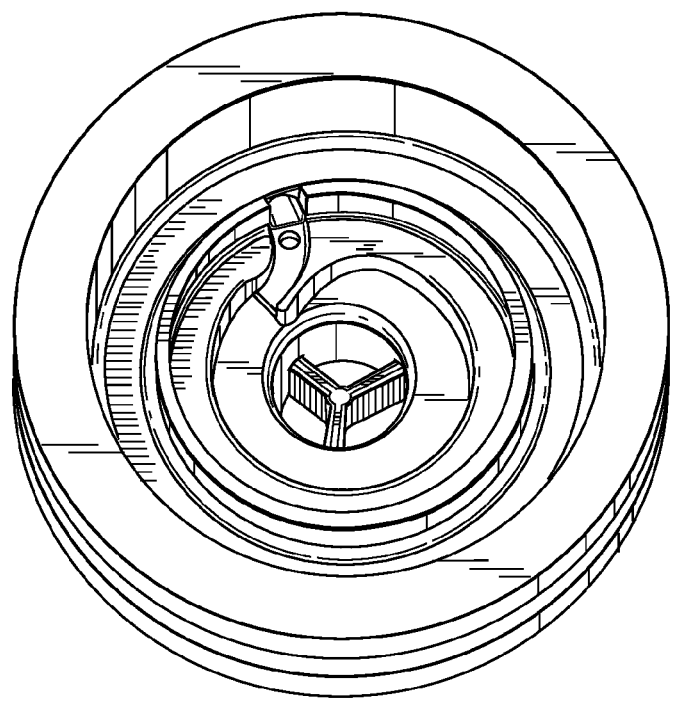
Figure 26B:
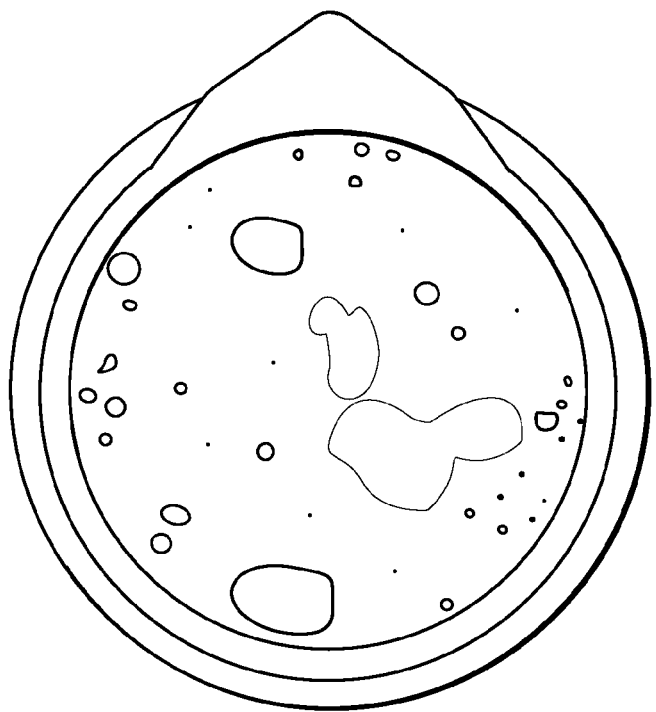
Figure 25C:
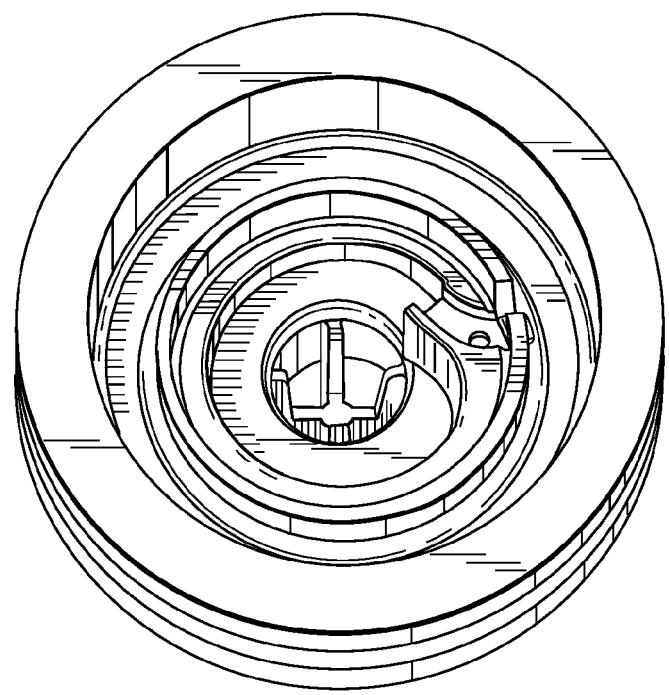
Figure 26C:
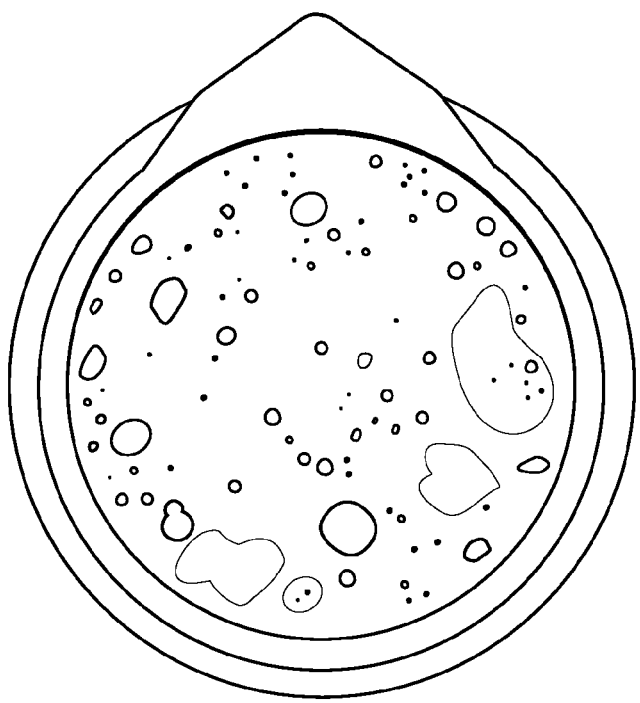
Figure 25D:
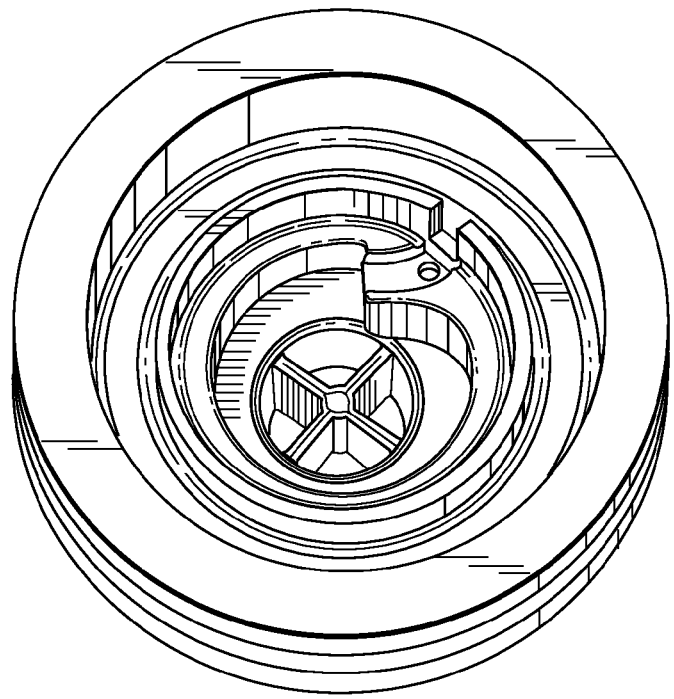
Figure 26D:
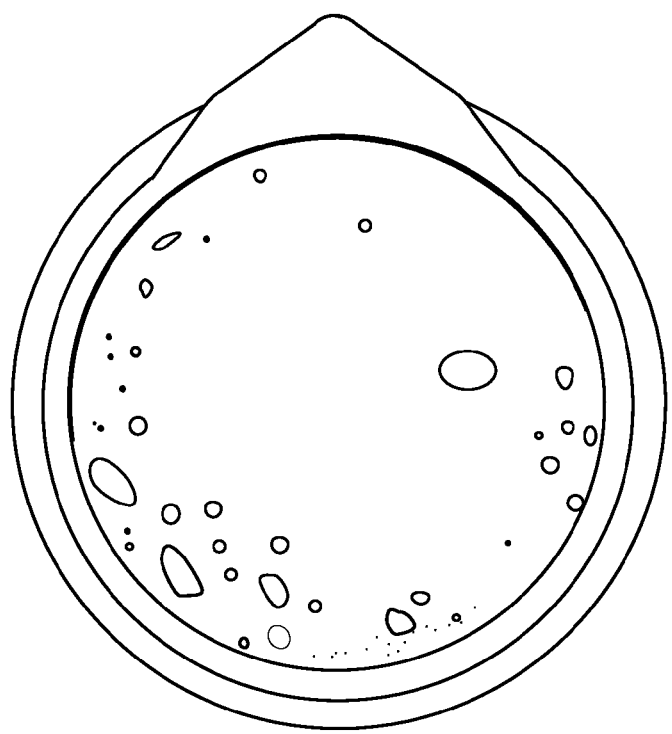
Figure 25E:
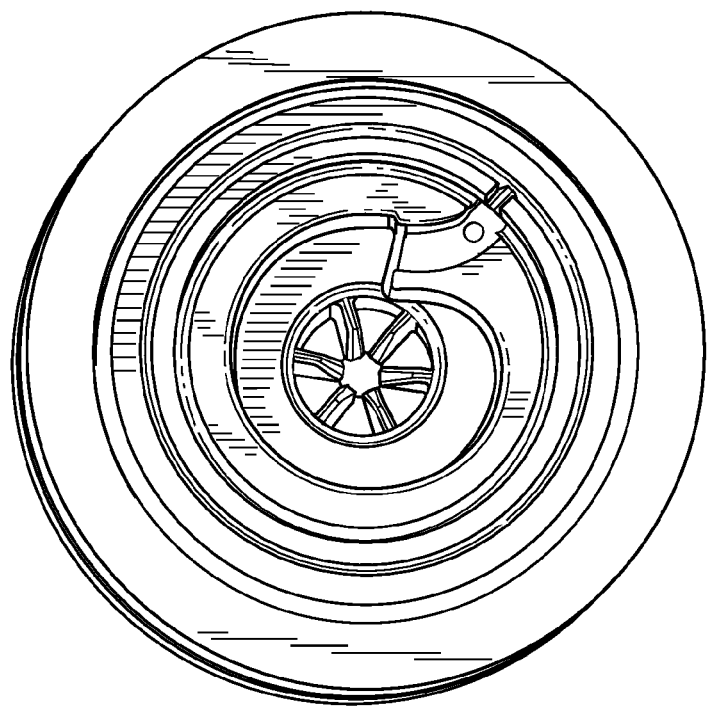
Figure 26E:
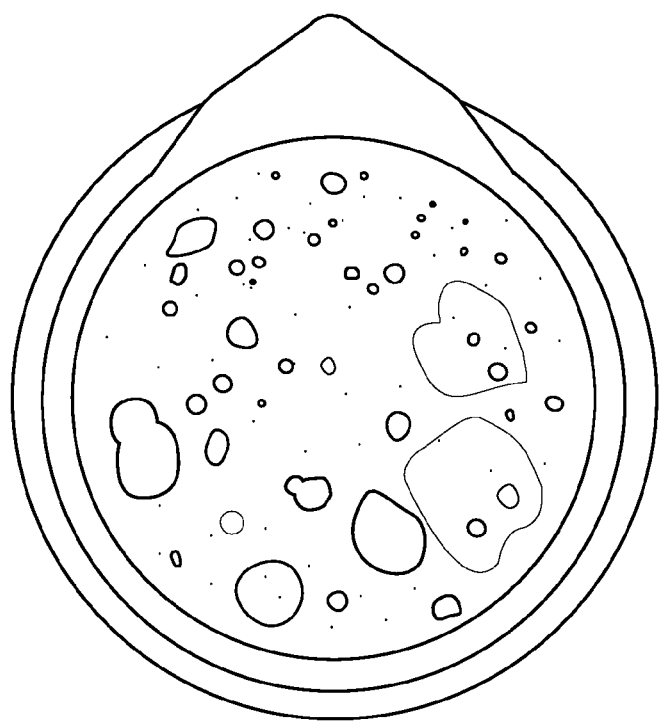
Figure 25F:
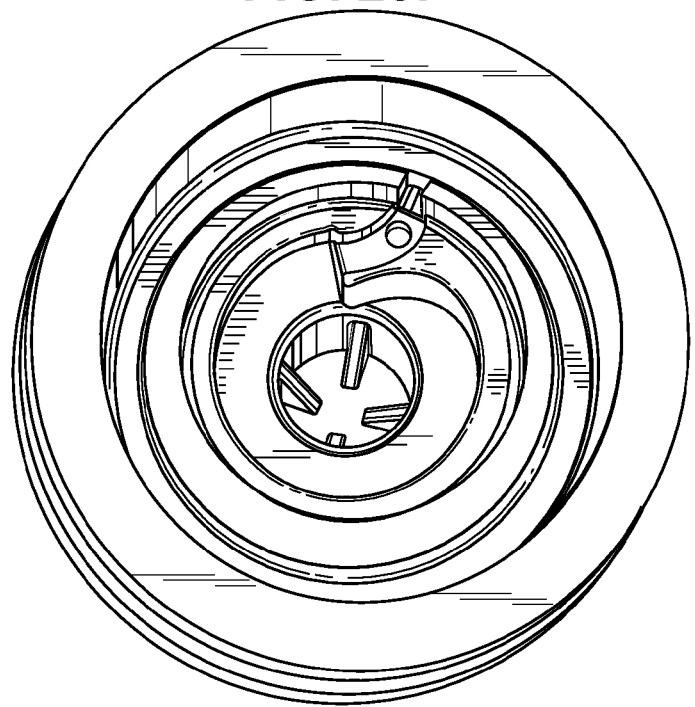
Figure 26F:
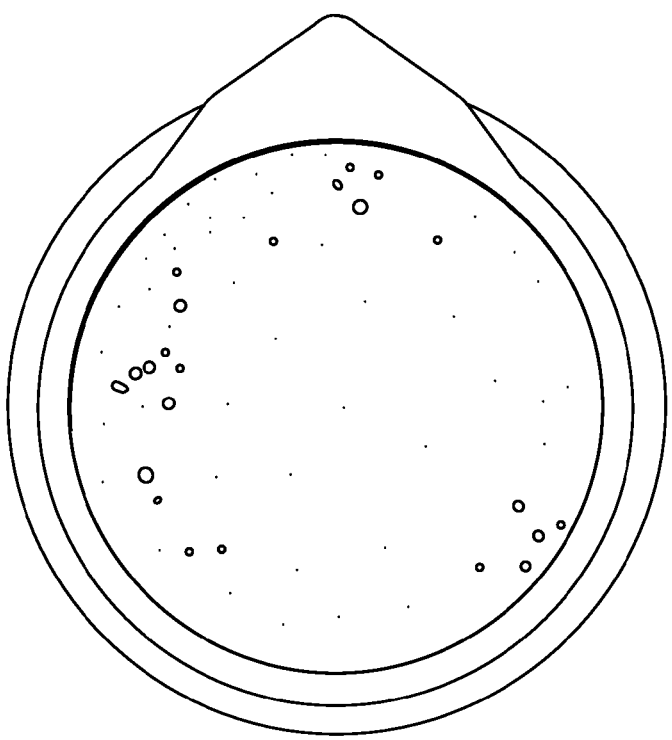
Figure 25G:
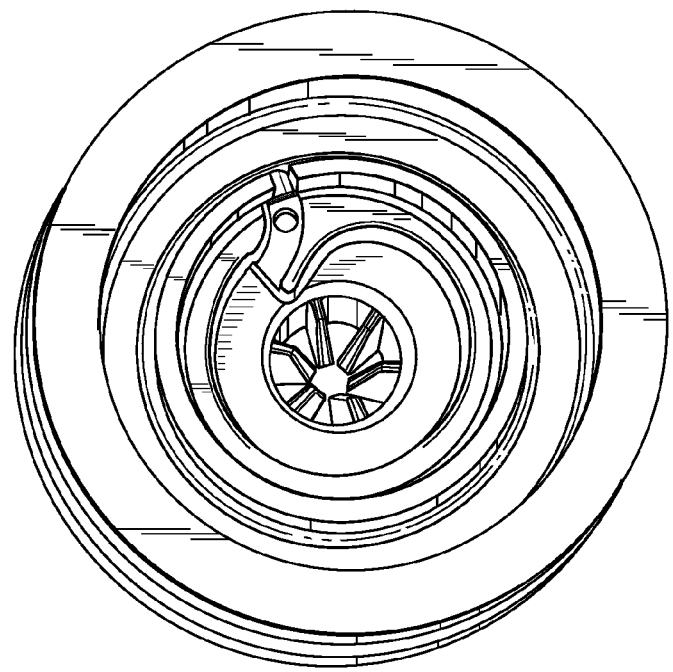
Figure 26G:
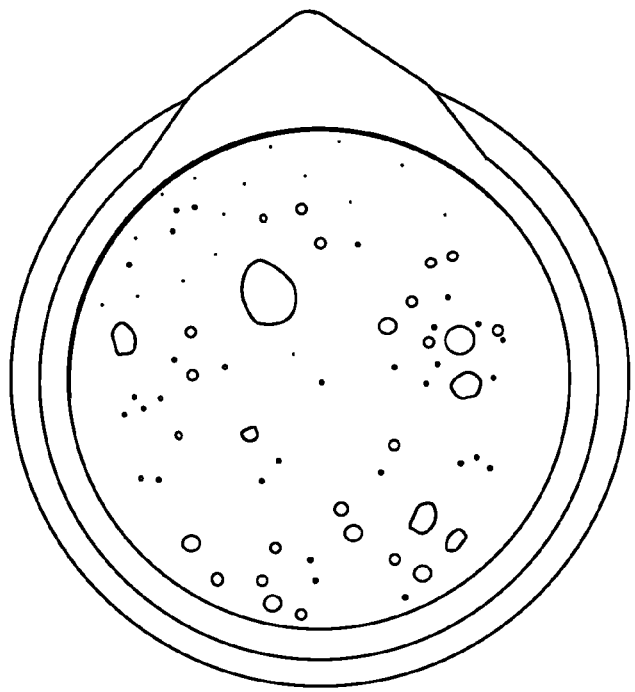

| Outlet Design (Reference no.) | Number & type of ribs | Open area | Flow Characteristics | Foam |
| --- | --- | --- | --- | --- |
| FIG. 24 (Ref: 51) | NO RIBS | 8.88 mm2 | Direction consistency: VERY POOR. No discernable main stream. Coffee leaves disc outlet in a spinning cone with an inclusive angle of 80 degrees Stability: VERY POOR Cup delivery: VERY POOR - most of drink misses the cup. | Photograph not taken - Insufficient drink/foam in cup. |
| FIG. 25a (Ref: 55) | 1 CROSS RIB | 7.50 mm2 | Direction consistency: POOR. Main stream direction tends to vary by up to +/−25 to 30 degrees to the vertical. Stability: POOR - Evidence can be seen of two streams in opposite directions "competing" against each other. One stream is dominant. Cup delivery: VERY POOR Significant side spray outside of cup. | FIG. 26a |
| FIG. 25b (Ref: 56) | 3 CROSS RIBS | 6.84 mm2 | Direction consistency: GOOD. Main stream less than 10 degrees from vertical Stability: FAIR - some movement of mainstream within 10 degree limit, influenced by the pull from a strong side spray. Cup delivery: POOR - Some side spray outside of cup. | FIG. 26b |
| FIG. 25c (Ref: 49) | 4 SHALLOW CROSS RIBS | 6.56 mm2 | Direction consistency: GOOD. Main stream 10 degrees from vertical Stability: FAIR - Slight main stream movement. Lots of fine side spray Cup delivery: VERY POOR - Significant side spray outside of cup. | FIG. 26c |
| FIG. 25d (Ref: 58) | 4 DEEP CROSS RIBS | 6.20 mm2 | Direction consistency: GOOD. Maximum 10 degrees from vertical Stability: FAIR - stream rapidly oscillates in several directions but within +/−10 degrees limit. (Possibly due to separate vortex flows | FIG. 26d |

TABLE 3-continued

| Outlet Design (Reference no.) | Number & type of ribs | Open area | Flow Characteristics | Foam |
|---|---|---|---|---|
| | | | established in each quadrant) Cup delivery: FAIR to GOOD - Little side spray, mostly inside the cup. | |
| FIG. 25e (Ref: 65) | 6 CROSS RIBS | 4.92 mm2 | Direction consistency: GOOD. About 5-10 degrees from vertical Stability: GOOD - main stream very stable, but with fine side spray. Cup delivery: VERY POOR - significant side spray outside cup. | FIG. 26e |
| FIG. 25f (Ref: 50) | 4 OPEN RIBS | 7.29 mm2 | Direction consistency: GOOD. About 10 degrees from vertical Stability: FAIR to GOOD - main stream moves by maximum 5 degrees. Cup delivery: GOOD - all in cup, no side spray. | FIG. 26f |
| FIG. 25g (Ref: 63) | 6 OPEN RIBS | 6.14 mm2 | Direction consistency: VERY GOOD. Less than 5 degrees from vertical Stability: VERY GOOD - stream hardly moves. Cup delivery: VERY GOOD - all in cup no side spray. | FIG. 26g |

For each outlet design (listed by reference no.), the number and type of ribs, open area, flow characteristics and an illustration of the resultant foam are given.

The experimental results (and further experimentation) show that between four and eight fins are beneficial in producing a more directable and confined flow of beverage issuing from the cartridge without any noticeable deterioration in crema quality or quantity.

Although several embodiments of cartridge have been described above, any one or more or all of the features described (and/or claimed in the appended claims) may be provided in isolation or in various combinations in any of the embodiments. As such, any one or more of these features may be removed, substituted and/or added to any of the feature combinations described and/or claimed. For the avoidance of doubt, any of the features of any embodiment may be combined with any other feature from any of the embodiments.

Whilst preferred embodiments of the present invention have been described above and illustrated in the drawings, these are by way of example only and non-limiting. It will be appreciated by those skilled in the art that many alternatives are possible within the scope of the invention, as set out in the appended claims.

We claim:

1. A method of using a cartridge for the preparation of beverages, the method comprising:
    introducing an aqueous medium into an inlet of a cartridge;
    mixing the aqueous medium with one or more beverage ingredients within the cartridge to form a beverage;
    directing the beverage in a first direction into a channel between a pair of spaced, curved walls of the channel;
    passing the beverage over an air inlet opening of the channel to entrain air into the beverage, the channel comprising a floor and the air inlet positioned at the floor of the channel;
    impacting the beverage with entrained air against an impact surface of one of the curved walls of the channel downstream of the air inlet opening;
    directing the beverage with entrained air in a second direction out of the channel and into a chamber of the cartridge along a spiral-shaped wall of the chamber;
    imparting a spiral-shaped flow to the beverage within the chamber about an outlet opening of the chamber using the spiral-shaped wall of the chamber; and
    discharging the beverage into a receptacle.

2. The method of claim 1 wherein imparting the spiral-shaped flow to the beverage includes causing the beverage to travel around the chamber about the outlet opening at least once before exiting the chamber via the outlet opening.

3. The method of claim 1 wherein directing the beverage into the chamber includes directing the beverage generally along an axis into the chamber; and
    imparting the spiral-shaped flow to the beverage within the chamber includes imparting an asymmetrical flow to the beverage on opposite sides of the axis.

4. The method of claim 1 wherein directing the beverage into the chamber of the cartridge includes directing the beverage along the channel from a first position above a floor of the chamber to a second position at the floor of the chamber.

5. The method of claim 4 wherein directing the beverage along the channel from the first position above the chamber floor to the second position at the chamber floor includes directing the beverage along a curved, sloped floor of the channel.

6. The method of claim 1 wherein the chamber outlet opening is disposed at a center of the chamber;
    passing the beverage over the air inlet opening of the channel to entrain air into the beverage includes forming air bubbles of varying sizes in the beverage including a first portion of the air bubbles and a second portion of the air bubbles; and imparting the spiral-shaped flow to the beverage within the chamber includes:
 conveying the first portion of the air bubbles outward toward an outer wall of the chamber; and
 conveying the second portion of the air bubbles inward toward the center outlet opening of the chamber and collapsing the second portion of the air bubbles.

7. The method of claim 1 wherein impacting the beverage against the impact surface includes a potential power dissipation of the beverage in the range of 0.002 Watts to 15.0 Watts.

8. The method of claim 7 wherein the potential power dissipation of the beverage is in the range of 0.1 Watts to 5.0 Watts.

9. The method of claim 8 wherein the potential power dissipation of the beverage is 0.34 Watts.

10. The method of claim 1 wherein directing the beverage into the channel includes forming a jet of the beverage and passing the beverage over the air inlet opening includes passing the jet over the air inlet opening.

11. The method of claim 10 wherein forming the jet of beverage includes passing the beverage through an aperture and discharging the jet of beverage from the aperture wherein the jet has a velocity in the range of 1.25 meters per second to 100 meters per second as the jet exits the aperture.

12. The method of claim 11 wherein the jet exiting the aperture has a velocity in the range of 6.9 meters per second to 35 meters per second.

13. The method of claim 12 wherein the jet exiting the aperture has a velocity of 17.13 meters per second.

14. The method of claim 1 further comprising passing the beverage through a filter of the cartridge.

15. The method of claim 1 wherein passing the beverage over the air inlet opening of the channel to entrain air into the beverage includes drawing air into the beverage at a flow rate in the range of 333 millimeters cubed per second to 13,333 millimeters cubed per second.

16. The method of claim 15 wherein the air flow rate is in the range of 667 millimeters cubed per second to 6,667 millimeters cubed per second.

17. The method of claim 16 wherein the air flow rate is 1,233 millimeters cubed per second.

18. The method of claim 1 further comprising directing the beverage along the one curved wall of the channel having a radius of curvature in the range of 1.50 mm to 5.50 mm.

19. The method of claim 18 wherein directing the beverage along the one curved wall of the channel includes directing the beverage along the one curved wall of the channel having a radius of curvature in the range of 2 mm to 3 mm.

20. The method of claim 19 wherein directing the beverage along the one curved wall of the channel includes directing the beverage along the one curved wall of the channel having a radius of curvature of 2.5 mm.

21. A method of using a cartridge for the preparation of beverages, the method comprising:
 introducing an aqueous medium into an inlet of a cartridge;
 mixing the aqueous medium with one or more beverage ingredients within the cartridge to form a beverage;
 directing the beverage in a first direction into a channel between a pair of spaced, curved walls of the channel;
 passing the beverage over an air inlet opening of the channel to entrain air into the beverage, the channel comprising a floor and the air inlet positioned at the floor of the channel;
 impacting the beverage with entrained air against an impact surface of one of the curved walls of the channel downstream of the air inlet opening;
 directing the beverage out of an exit opening of the channel in a second direction and into a chamber of the cartridge along a spiral-shaped wall of the chamber, the spiral-shaped wall beginning at the exit opening of the channel and extending about the chamber such that the beverage travels into the chamber along a path offset from a central axis of the chamber extending through a center of an outlet of the chamber;
 rotating the beverage around the central axis of the chamber;
 directing the rotating beverage into the outlet of the chamber; and
 discharging the beverage into a receptacle.

22. The method of claim 21 wherein rotating the beverage around the central axis of the chamber includes causing the beverage to travel around the central axis of the chamber a plurality of times before exiting the chamber via the outlet.

23. The method of claim 21 wherein rotating the beverage around the central axis of the chamber includes imparting a spiral-shaped flow to the beverage within the chamber.

24. The method of claim 21 wherein directing the beverage into the chamber of the cartridge includes directing the beverage along the channel from a first position above a floor of the chamber to a second position at the floor of the chamber.

25. The method of claim 24 wherein directing the beverage along the channel from the first position above the chamber floor to the second position at the chamber floor includes directing the beverage along a curved, sloped floor of the channel.

26. The method of claim 21 wherein directing the beverage into the channel includes forming a jet of the beverage.

27. The method of claim 21 further comprising passing the beverage through a filter of the cartridge.

28. The method of claim 21 further comprising directing the beverage along the one curved wall of the channel.

* * * * *